(12) United States Patent
Uchiyama et al.

(10) Patent No.: US 8,722,806 B2
(45) Date of Patent: May 13, 2014

(54) RUBBER COMPOSITION AND TIRE USING THE SAME

(75) Inventors: Toshihiro Uchiyama, Kodaira (JP); Seiichi Kato, Kodaira (JP); Rika Fukushima, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 530 days.

(21) Appl. No.: 12/867,700

(22) PCT Filed: Feb. 16, 2009

(86) PCT No.: PCT/JP2009/052581
§ 371 (c)(1),
(2), (4) Date: Mar. 23, 2011

(87) PCT Pub. No.: WO2009/102067
PCT Pub. Date: Aug. 20, 2009

(65) Prior Publication Data
US 2011/0196100 A1    Aug. 11, 2011

(30) Foreign Application Priority Data

Feb. 15, 2008 (JP) .................. 2008-034971
Jun. 18, 2008 (JP) .................. 2008-159449
Feb. 5, 2009 (JP) .................. 2009-025204

(51) Int. Cl.
*C08L 9/00* (2006.01)
*C08L 25/02* (2006.01)
*C08L 45/00* (2006.01)
*C08J 3/22* (2006.01)
*B60C 1/00* (2006.01)

(52) U.S. Cl.
USPC ........... 525/210; 525/211; 525/232; 525/241; 524/525; 524/526

(58) Field of Classification Search
USPC ........... 525/210, 211, 232, 241; 524/525, 526
See application file for complete search history.

(56) References Cited

U.S. PATENT DOCUMENTS

| | | | |
|---|---|---|---|
| 4,113,801 A | 9/1978 | Douglas et al. | |
| 4,487,892 A | 12/1984 | Ohmori et al. | |
| 4,603,186 A | 7/1986 | Wu et al. | |
| 5,877,249 A | 3/1999 | Lambotte | |
| 6,265,478 B1 | 7/2001 | Kralevich, Jr. et al. | |
| 6,281,318 B1 | 8/2001 | Yamamoto et al. | |
| 6,316,567 B1 * | 11/2001 | Kralevich, Jr. et al. | 526/283 |
| 8,318,861 B2 * | 11/2012 | Houjo et al. | 525/191 |
| 2004/0092665 A1 | 5/2004 | Pazur et al. | |

FOREIGN PATENT DOCUMENTS

| | | |
|---|---|---|
| EP | 0245554 A2 | 11/1987 |
| EP | 1077223 A1 | 2/2001 |
| EP | 1559586 A1 | 8/2005 |
| EP | 1748052 A1 | 1/2007 |
| JP | 6-332305 | 12/1994 |
| JP | 09-328577 A | 12/1997 |
| JP | 10-195238 A | 7/1998 |
| JP | 10-195242 A | 7/1998 |
| JP | 10-306121 A | 11/1998 |
| JP | 11-049894 A | 2/1999 |
| JP | 2001-098036 A | 4/2001 |
| JP | 2001-122912 A | 5/2001 |
| JP | 2004-505153 A | 2/2004 |
| JP | 2006-131658 A | 5/2006 |
| JP | 2007-112994 A | 5/2007 |
| JP | 2007-302713 A | 11/2007 |
| WO | 2008/084860 A1 | 7/2008 |

OTHER PUBLICATIONS

Extended European Search Report issued Dec. 22, 2011 in European Patent Application No. 09710383.2.
Japanese Office Action issued on Sep. 3, 2013 from the Japan Patent Office in Japanese Application No. 2009-025204.
Office Action issued on Nov. 12, 2013 from the Japanese Patent Office in Japanese Application No. 2009-025256.

* cited by examiner

*Primary Examiner* — Nathan M Nutter
(74) *Attorney, Agent, or Firm* — Sughrue Mion, PLLC

(57) ABSTRACT

An object of the present invention is to provide a rubber composition for a tire, which is, when it is used as a rubber composition for a tire, capable of exhibiting good dry grip properties and excellent grip properties in both a relatively low temperature range and a relatively high temperature range, as well as a tire produced by using the rubber composition. The rubber composition of the present invention contains: a rubber component made of at least one type of diene-based polymer; and a copolymer resin obtained by copolymerizing α-methylstyrene based monomer and aromatic vinyl monomer.

17 Claims, No Drawings

RUBBER COMPOSITION AND TIRE USING THE SAME

CROSS REFERENCE TO RELATED APPLICATION

This application is a National Stage of International Application No. PCT/JP2009/052581 filed Feb. 16, 2009, claiming priority based on Japanese Patent Application No. 2008-034971, filed Feb. 15, 2008, Japanese Patent Application No. 2008-159449, filed Jun. 18, 2008, and Japanese Patent Application No. 2009-025204, filed Feb. 5, 2009, the contents of all of which are incorporated herein by reference in their entirety.

TECHNICAL FIELD

The present invention relates to a rubber composition and, in particular, a rubber composition which is, when it is used for a tire, capable of improving dry grip properties and grip properties in both a relatively low temperature range and a relatively high temperature range, as compared with the conventional tire. The present invention also relates to a tire produced by using the rubber composition.

PRIOR ART

There has been a demand for a high-performance tire for general purposes, which is excellent in various performances. Grip performance, in particular, is one of the important performances of a tire and this property is heavily influenced by characteristics of rubber.

Grip performance is evaluated by wet grip performance and the like, as well as by how excellent a tire is in driving stability on a dry road surface (dry grip properties) from the initial to the last stage of a product life thereof. There have conventionally been developed rubber compositions for a tire, which impart the tire with various grip performances.

For example, JP 09-328577 Laid-Open discloses a rubber composition containing only α-methylstyrene polymer blended therein and attempts to improve grip performance of a tire by making rubber soft by the rubber composition. Further, JP 2007-112994 discloses a rubber composition produced by having diene-based rubber contain polymer made of styrene monomer, thereby proving that the rubber composition has good grip performance. Yet further, as rubber compositions particularly capable of realizing improvement in wet grip performance, JP 2007-302713 discloses a rubber composition produced by having diene-based rubber contain polymer made of a monomer component such as styrene, α-methylstyrene or the like and JP 11-049894, JP 10-195242 and JP 10-195238 each disclose a rubber composition produced by having diene-based rubber contain polymer made of a monomer component such as α-methylstyrene, aromatic substituted α-methylstyrene. In the these references, not only good grip performance but also good wear resistance, relatively low fuel consumption and rolling resistance are provided to a tire according to necessity by regulating characteristics of a monomer forming polymers from various view points by employing aromatic vinyl polymer.

DISCLOSURE OF THE INVENTION

Problems to be Solved by the Invention

However, in the case where only indene polymer is blended to such a rubber composition as described above, rubber of a tire using the rubber composition for tread rubber is quite hard, whereby improvement in grip performance at a relatively low temperature is not satisfactory. In the case where only α-methylstyrene polymer is blended to such a rubber composition as described above, rubber of a tire using the rubber composition for tread rubber is soft but improvement in grip performance at a relatively high temperature is not satisfactory.

In a case where both indene polymer and α-methylstyrene polymer are blended to such a rubber composition as described above, a tire using these rubber compositions for tread rubber exhibits insufficient improvement in grip performance at both relatively high temperature and relatively low temperature and also exhibits poor dispersion properties of resin during blending.

On the other hand, in a case where α-methylstyrene monomer is employed for such a rubber composition as described above, grip performance itself is improved but operational properties at a relatively low temperature range is not necessarily satisfactory because dispersion properties of the monomer with respect to the polymer may deteriorate. In a case where aromatic substituted α-methylstyrene monomer is employed for such a rubber composition as described above, although dispersion properties of the monomer with respect to the polymer improves and exhibits good operational properties in a relatively low temperature range, there is still room left for improvement regarding grip performance at a relatively high temperature. The improvement of grip performance of a tire is not satisfactory yet as described above. Therefore, there is a demand for provision of a tire of which grip performance has been improved as compared with the conventional tire.

In view of this, an object of the present invention is to provide a rubber composition for a tire, which is, when it is used as a rubber composition for a tire, capable of exhibiting good dry grip properties and excellent grip properties in both a relatively low temperature range and a relatively high temperature range, as well as a tire produced by using the rubber composition.

Means for Solving the Problems

As a result of a study for solving the problems described above, the inventors of the present invention have discovered that a tire can exhibit excellent grip performance by employing a rubber composition produced by blending with a rubber component a copolymer resin obtained by copolymerizing two specific types of monomers, thereby completing the present invention.

Specifically, a rubber composition of the present invention, comprising: a rubber component made of at least one type of diene-based polymer; and a copolymer resin obtained by copolymerizing α-methylstyrene based monomer and aromatic vinyl monomer.

In one or first aspect of the rubber composition of the present invention, the α-methylstyrene based monomer is monomer (I) represented by formula (I) below and the aromatic vinyl monomer is indene, and the rubber composition comprises, with respect to 100 parts by mass of the rubber component, 1 to 100 parts by mass of a copolymer resin obtained by copolymerizing "a" mass % of the monomer (I) and "b" mass % of said indene such that a and b satisfy formulae (II) to (IV) below.

$$5 \leq a < 95 \tag{II}$$

$$1 < b \leq 95 \tag{III}$$

$$90 < a+b \leq 100 \tag{IV}$$

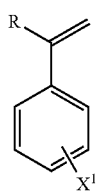

(I)

In formula (I), R represents a hydrogen atom or a $C_1$-$C_8$ normal or branched alkyl group, $X^1$ represents a hydrogen atom or a $C_1$-$C_8$ normal or branched alkyl group, an aryl group having a substitution group, or a halogen group, and R and $X^1$ may be either the same or different.

Further, it is preferable that the monomer (I) represented by the formula (I) is α-methylstyrene, the copolymer resin is an α-methylstyrene/indene copolymer resin, and the proportion of said α-methylstyrene (a mass %) satisfies formula (V) below.

$$60 \leq a < 95 \quad (V)$$

Yet further, it is preferable that the softening point of the α-methylstyrene/indene copolymer resin is in the range of 100 to 170° C.

Yet further, it is acceptable that $X^1$ in formula (I) is a $C_1$-$C_8$ normal or branched alkyl group, an aryl group having a substitution group, or a halogen group, the softening point of the copolymer resin is in the range of 160 to 250° C., and the weight-average molecular weight (Mw) of the copolymer resin is in the range of 1,000 to 10,000. Yet further, it is preferable that the monomer (I) represented by the formula (I) is 4-tert-butyl-α-methylstyrene.

In another or second aspect of the rubber composition of the present invention, the rubber composition comprises: the rubber composition; and a copolymer resin obtained by copolymerizing the α-methylstyrene based monomer as a monomer (VIII) represented by formula (VIII) below and the aromatic vinyl monomer as monomer (IX) represented by formula (IX) below.

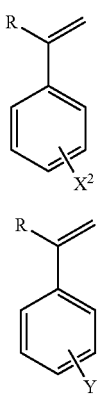

In formula (VIII) and formula (IX), R represents a hydrogen atom or a $C_1$-$C_8$ normal or branched alkyl group. In formula (VIII), $X^2$ represents a hydrogen atom, a $C_1$-$C_8$ alkyl group, a $C_1$-$C_8$ aryl group, a $C_1$-$C_8$ alkenyl group, or a halogen group. In formula (IX), Y represents a $C_1$-$C_8$ alkyl group, a $C_1$-$C_8$ aryl group, a $C_1$-$C_8$ alkenyl group, or a halogen group. It should be noted that $X^2$ and Y are different from each other.

Yet further, regarding the monomer (VIII) and the monomer (IX), it is preferable that R in the formula (VIII) and the formula (IX) is a hydrogen atom and that the weight-average molecular weight (Mw) of the copolymer resin made of the monomer (VIII) and the monomer (IX) is in the range of 3,000 to 30,000. Yet further, it is preferable that $X^2$ in formula (VIII) is a hydrogen atom, $CH_3$ or $C_3H_7$ in the monomer (VIII) and that Y in formula (IX) is $CH_3$, $C_3H_7$ or $C_4H_9$ in the monomer (IX).

Yet further, it is acceptable that the copolymer resin is obtained by copolymerizing the monomer (VIII) as a monomer in which $X^2$ in formula (VIII) is a hydrogen and the monomer (IX) as a monomer in which Y in formula (IX) is $CH_3$ and that a proportion of the monomer (IX) is in the range of 20 to 70 mass % with respect to the total 100 mass % of the monomer (VIII) and the monomer (IX).

Yet further, it is acceptable that the copolymer resin is obtained by copolymerizing the monomer (VIII) as a monomer in which $X^2$ in formula (VIII) is a hydrogen and the monomer (IX) as a monomer in which Y in formula (IX) is $C_4H_9$ and that a proportion of the monomer (IX) is in the range of 40 to 95 mass % with respect to the total 100 mass % of the monomer (VIII) and the monomer (IX).

Yet further, it is acceptable that the copolymer resin is obtained by copolymerizing the monomer (VIII) as a monomer in which $X^2$ in formula (VIII) is a hydrogen and the monomer (a) as a monomer in which Y in formula (IX) is $C_3H_7$ and that a proportion of the monomer (IX) is in the range of 30 to 90 mass % with respect to the total 100 mass % of the monomer (VIII) and the monomer (IX).

Yet further, it is acceptable that the copolymer resin is obtained by copolymerizing the monomer (VIII) as a monomer in which $X^2$ in formula (VIII) is $CH_3$ and the monomer (IX) as a monomer in which Y in formula (IX) is $C_4H_9$ and that a proportion of the monomer (IX) is in the range of 20 to 95 mass % with respect to the total 100 mass % of the monomer (VIII) and the monomer (IX).

Yet further, it is acceptable that the copolymer resin is obtained by copolymerizing the monomer (VIII) as a monomer in which $X^2$ in formula (VIII) is $C_3H_7$ and the monomer (IX) as a monomer in which Y in formula (IX) is $C_4H_9$ and that a proportion of the monomer (IX) is in the range of 10 to 80 mass % with respect to the total 100 mass % of the monomer (VIII) and the monomer (IX).

Yet further, it is preferable that 1 to 100 parts by mass of the copolymer resin is blended with 100 parts by mass of the rubber component. The tire of the present invention is obtained by using the aforementioned rubber composition of the first or second aspect of the present invention.

Effect of the Invention

According to the present invention, it is possible to provide a rubber composition which is, when it is used for a tire, capable of improving dry grip properties and grip properties in both a relatively low temperature range and a relatively high temperature range and a tire produced by using the rubber composition.

BEST MODE FOR IMPLEMENTING THE INVENTION

Hereinafter, the present invention will be described in detail. A rubber composition of the present invention is characterized in that it comprises: a rubber composition made of at least one type of diene-based polymer; and a copolymer resin obtained by copolymerizing α-methylstyrene based monomer and aromatic vinyl monomer.

In the present embodiment, "α-methylstyrene based monomer" represents a monomer having in a portion of the structure thereof α-methylstyrene, of which examples include monomer (I) represented by formula (I) and monomer (VIII) represented by formula (VIII) described below. Further, "aromatic vinyl monomer" represents a monomer having in a portion of the structure thereof aromatic vinyl, of which examples include indene and monomer (IX) represented by formula (IX) described below.

In the present embodiment, a "weight-average molecular weight (Mw)" represents a weight-average molecular weight in terms of polystyrene equivalents obtained by gel permeation chromatography (GPC).

Hereinafter, one or first aspect and another or second aspect of the rubber composition of the present invention will be described in this order.

[Rubber Composition in First Aspect]

In a rubber composition according to a first aspect of the present invention, the α-methylstyrene based monomer of a copolymer resin is a monomer (I) represented by formula (I) below and the aromatic vinyl monomer of the copolymer resin is indene, and the rubber composition comprises, with respect to 100 parts by mass of the rubber component, 1 to 100 parts by mass of the copolymer resin obtained by copolymerizing "a" mass % of the monomer (I) represented by formula (I) and "b" mass % of indene such that a and b satisfy formulae (II) to (IV) below. The rubber composition produced by blending with the rubber component the copolymer resin obtained by copolymerizing the monomer (I) represented by formula (I) and indene retains adequate softness of rubber, whereby a tire produced by using the rubber composition exhibits significant improvement in dry grip properties and the like. Further, the copolymer resin exhibits good dispersion properties during blending.

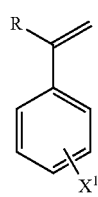

(I)

Further, although the type of the monomer (I) represented by formula (I) of the rubber composition according to the first aspect of the present invention is not particularly restricted as long as the rubber composition satisfies the aforementioned conditions, the monomer (I) is preferably α-methylstyrene having a methyl group as R and no substituent group as $X^1$ in formula (I) or 4-tert-butyl-α-methylstyrene as the monomer (I) in which R is methyl group and $X^1$ is a tert-butyl group bonded at the p site in formula (I). Specifically, preferable examples of the copolymer resin include an α-methylstyrene/indene copolymer resin and a 4-tert-butyl-α-methylstyrene/indene copolymer resin. The α-methylstyrene/indene copolymer resin is represented by formula (VI) below (n and m are given integers).

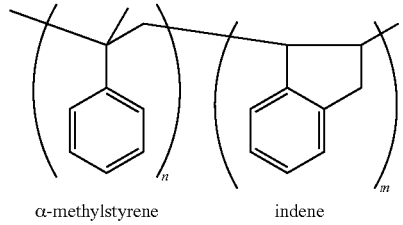

(VI)

α-methylstyrene      indene

Further, the 4-tert-butyl-α-methylstyrene/indene copolymer resin is represented by formula (VII) below (n and m are given integers).

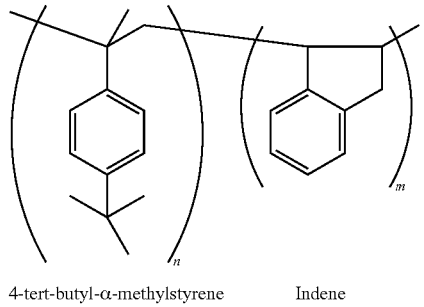

(VII)

4-tert-butyl-α-methylstyrene      Indene

In the rubber composition of the present invention, if the proportion ("a" mass %) of the monomer (I) represented by formula (I) during copolymerization of the copolymer resin is less than 5 mass %, rubber hardens and good grip properties of a tire is less likely to ensured. If the proportion of the monomer (I) exceeds 95 mass %, grip properties of the tire does not improve. Further, the proportion ("a" mass %) of the monomer (I) represented by formula (I) during copolymerization of the copolymer resin is preferably in the range of 20 to 95 mass %, and more preferably in the range of 20 to 50 mass %. In the present embodiment, in a case where the monomer (I) represented by formula (I) during copolymerization of the copolymer resin is α-methylstyrene, the proportion ("a' mass %) is preferably in the range of 60≤a<95 and more preferably in the range of 75≤a<95.

Further, if the proportion ("b" mass %) of indene during copolymerization of the copolymer resin is not larger than 1 mass %, rubber hardens and good grip properties of a tire is less likely to ensured. If the proportion of indene exceeds 95 mass %, grip properties of the tire cannot be sufficiently ensured. Yet further, the proportion of indene ("b" mass %) during copolymerization of the copolymer resin is preferably in the range of 5 to 80 mass %, and more preferably in the range of 50 to 80 mass %. In the present embodiment, in a case where the monomer (I) represented by formula (I) during copolymerization of the copolymer resin is α-methylstyrene, the proportion of indene ("b' mass %) is preferably in the range of 1≤b<40 (mass %) and more preferably in the range of 5≤b<30 (mass %). In a case where the monomer (I) represented by formula (I) is 4-tert-butyl-α-methylstyrene, the proportion of indene ("b' mass %) is preferably in the range of 40≤b<95 (mass %).

If the sum of the proportion of the monomer (I) represented by formula (I) and the proportion of indene during copolymerization of the copolymer resin described above, i.e. (a+b) mass %, is 90 mass % or less, it is difficult to retain adequate rubber softness. In the present embodiment, the sum of the proportion of the monomer (I) represented by formula (I) and the proportion of indene, i.e. (a+b) mass %, is preferably in the range of 95 to 100 mass %.

In the rubber composition according to the first aspect of the present invention, in a case where the copolymer resin is α-methylstyrene/indene copolymer resin, the softening point of the α-methylstyrene/indene copolymer resin is preferably in the range of 100 to 170° C. In a case where the softening point of the α-methylstyrene/indene copolymer resin is lower than 100° C., grip properties of a tire does not sufficiently improve. In a case where the softening point of the α-methylstyrene/indene copolymer resin exceeds 170° C., rubber hardens. Further, the softening point of the α-methylstyrene/indene copolymer resin is preferably in the range of 120 to 170° C. and more preferably in the range of 140 to 165° C.

Further, in the rubber composition according to the first aspect of the present invention, in a case where $X^1$ in formula (I) is a $C_1$-$C_8$ normal or branched alkyl group, an aryl group having a substitution group, or a halogen group, the softening point of the copolymer resin is preferably in the range of 160 to 250° C. In the present embodiment, in a case where the softening point of the copolymer resin is lower than 160° C., grip properties of a tire does not improve. In a case where the softening point of the copolymer resin exceeds 250° C., rubber hardens.

In the rubber composition according to the first aspect of the present invention, the weight-average molecular weight of the copolymer resin is preferably n the range of 1,000 to 10,000. In the present embodiment, in a case where the weight-average molecular weight of the copolymer resin is less than 1000, grip properties of a tire does not improve. In a case where the weight-average molecular weight of the copolymer resin exceeds 10,000, it is difficult to retain adequate rubber softness. The weight-average molecular weight of the copolymer resin is preferably in the range of 1500 to 4500 and more preferably in the range of 2500 to 3500.

A method for polymerization of the copolymer resin is not particularly restricted, and the aforementioned resin can be obtained by copolymerizing the aforementioned monomer according to the method described below. First, the aforementioned monomer is mixed with an organic solvent and the mixture is stirred. The mixture is heated or cooled according to necessity and a catalyst is added dropwise thereto during a period of 10 to 30 minutes, while the temperature of the mixture is maintained in the range of 5 to 75° C., preferably in the range of 40 to 70° C. Next, a polymerization reaction is allowed to proceed for 10 to 40 minutes, while the aforementioned temperature is maintained.

Examples of the organic solvent include cyclohexane, benzene, n-hexane, n-heptane, toluene, ethylbenezene, an ether-based compound such as tetrahydrofuran and diethyl ether, mixture of at least two types of these compounds.

Types of the catalyst for use in the polymerization reaction is not particularly restricted and preferable examples thereof include boron trifluoride-phenol complex and the like.

Upon completion of the polymerization reaction described above, the resulting product is filtered and dried by the conventional method to obtain the resin of the present invention.

Type of the rubber component for use in the rubber composition according to the first aspect of the present invention is not particularly restricted, except that the rubber composition should contain at least one type of diene-based polymer. For example, diene-based polymer such as styrene-butadiene copolymer, natural rubber, polybutadiene rubber, polyisoprene rubber, isobutylene-isoprene copolymer, polychloroprene and the like can be used either solely or in combination.

The rubber composition according to the first aspect of the present invention is produced by blending 1 to 100 parts by mass of the aforementioned copolymer resin with respect to 100 parts by mass of the aforementioned rubber component. Regarding this rubber composition according to the first aspect of the present invention, in a case where a blended amount of the copolymer resin with respect to 100 parts by mass of the rubber component is less than 1 part by mass, an effect of the resin with respect to the rubber composition is not sufficient. In a case where the blended amount of the copolymer exceeds 100 parts by mass, the workability of the rubber composition deteriorates.

In addition to the resin and the rubber component, an additive which is generally used in the rubber industry, such as carbon black, vulcanizing agent, vulcanizing accelerator, anti-aging agent, softener, zinc oxide, stearic acid and the like, can be appropriately selected and blended with the rubber composition according to the first aspect of the present invention unless blending the additive with the rubber composition adversely affects the object of the present invention. Commercially available additives can be suitably used. The rubber composition according to the first aspect of the present invention can be obtained by compounding the aforementioned respective components by a roll, an internal mixer, a Banbury mixer or the like and then optionally vulcanizing the mixture.

[Rubber Composition in Second Aspect]

In a rubber composition according to a second aspect of the present invention, the rubber composition comprises: the rubber composition made of at least one type of diene-based polymer; and a copolymer resin obtained by copolymerizing the α-methylstyrene based monomer as monomer (VIII) represented by formula (VIII) below and the aromatic vinyl monomer as monomer (IX) represented by formula (IX) below.

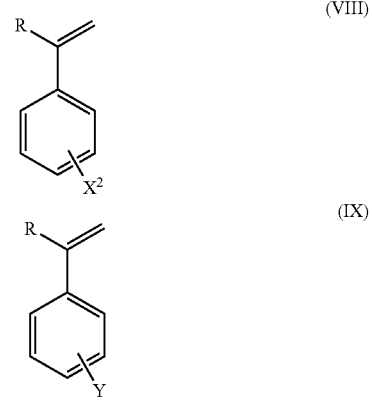

The monomer (VIII) represented by formula (VIII) is what is called α-methylstyrene based monomer. In formula (VIII), R represents a hydrogen atom or a $C_1$-$C_8$ normal or branched alkyl group and is preferably a hydrogen atom. $X^2$ represents one of: a hydrogen atom; a $C_1$-$C_8$, preferably $C_1$-$C_6$ and more preferably $C_1$-$C_4$ alkyl group; a $C_1$-$C_8$, preferably $C_1$-$C_6$ and more preferably $C_1$-$C_4$ aryl group; a $C_1$-$C_8$, preferably $C_1$-$C_6$ and more preferably $C_1$-$C_4$ alkenyl group; and a halogen group such as F, Cl, Br. $X^2$ in formula (VIII) and Y in formula (IX) are not the same but different substituent groups. Accordingly, the monomer (VIII) and the monomer (IX) are α-methylstyrene based monomers having chemical structures different from each other. In a case where R is a hydrogen atom in formula (VIII), the monomer (VIII) is represented by formula (VIII)' below (hereinafter, both the monomer represented by formula (VIII) and the monomer represented by formula (VIII)' will be referred to as "monomer (VIII)").

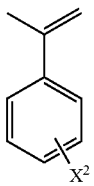

(VIII)'

X² may be substituted at at least one of ortho, metha and para positions of a benzene ring. Among the options, X² is preferably substituted at the para position of the benzene ring. Examples of X² include hydrogen atom and methyl, ethyl, n-propyl, iso-propyl, n-butyl, iso-butyl, s-butyl, t-butyl, pentyl, hexyl, heptyl, octyl, phenyl, tolyl, naphthyl, vinyl, aryl groups which may be either normal or branched. Specific examples of the monomer (VIII) include α-methylstyrene, 4, α-dimethylstyrene, 4-tert-butyl-α-methylstyrene, 4-isopropyl-α-methylstyrene, and 4-octyl-α-methylstyrene. These compounds may be used either solely or as a combination of at least two types thereof. Among these examples, α-methylstyrene and 4, α-dimethylstyrene are preferable, and α-methylstyrene is especially preferable.

Not only heat resistance properties and impact resistance properties can be enhanced but also grip performance can be improved by using the monomer (VIII). If the monomer (VIII) were to be used solely, the compatibility of the monomer (VIII) with the rubber component might be poor. However, in the present invention, since the monomer (VIII) and the monomer (IX) of the type different from the monomer (VIII) are simultaneously used as described below, the monomers are excellently dispersed into the rubber component and it is possible to obtain a rubber composition exhibiting excellent grip performance in a relatively low temperature range by using a resin produced by copolymerizing these two types of monomers.

The monomer (IX) represented by formula (IX) is what is called α-methylstyrene based monomer. In formula (IX), R represents a hydrogen atom or a $C_1$-$C_8$ normal or branched alkyl group and is preferably a hydrogen atom. Y represents one of: a $C_1$-$C_8$, preferably $C_1$-$C_6$ and more preferably $C_1$-$C_4$ alkyl group; a $C_1$-$C_8$, preferably $C_1$-$C_6$ and more preferably $C_1$-$C_4$ aryl group; a $C_1$-$C_8$, preferably $C_1$-$C_6$ and more preferably $C_1$-$C_4$ alkenyl group; and a halogen group such as F, Cl, Br. X² in formula (VIII) and Y in formula (IX) are not the same, and Y is a monomer having a chemical structure different from that of the monomer (VIII), as described above. In a case where R is a hydrogen atom in formula (IX), the monomer (IX) is represented by formula (IX)' below (hereinafter, both the monomer represented by formula (IX) and the monomer represented by formula (IX)' will be both referred to as "monomer (IX)").

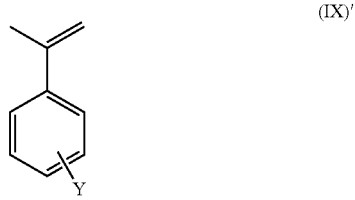

(IX)'

Y may be substituted at at least one of ortho, metha and para positions of a benzene ring. Among the options, Y is preferably substituted at the para position of the benzene ring. Examples of Y include methyl, ethyl, n-propyl, iso-propyl, n-butyl, iso-butyl, s-butyl, t-butyl, pentyl, hexyl, heptyl, octyl, phenyl, tolyl, naphthyl, vinyl, aryl groups which may be either normal or branched. Specific examples of the monomer (IX) include 4, α-dimethylstyrene, 4-tert-butyl-α-methylstyrene, 4-isopropyl-α-methylstyrene, and 4-octyl-α-methylstyrene. These compounds may be used either solely or as a combination of at least two types thereof. Among these examples, 4, α-dimethylstyrene and 4-tert-butyl-α-methylstyrene are preferable, and 4-tert-butyl-α-methylstyrene is especially preferable.

Copolymerization of the monomer (IX) enhances compatibility of the resulting resin with respect to the rubber component, whereby this good effect, combined with the performance exhibited by the monomer (VIII), enables effectively suppressing deterioration in grip performance in a relatively high temperature range, which deterioration tends to occur when the monomer (IX) is used solely. That is, it is possible to obtain a rubber composition exhibiting excellent grip performance in a relatively wide temperature range by using the copolymer resin produced by copolymerizing the two different types of α-methylstyrene based monomers described above.

The weight-average molecular weight (Mw) of the aforementioned resin is generally in the range of 3,000 to 30,000, preferably in the range of 8,000 to 30,000, more preferably in the range of 10,000 to 25,000, and most preferably in the range of 10,000 to 20,000. Grip performance can be improved throughout a very wide temperature range by setting the Mw of the resin within the aforementioned range.

Regarding amounts of the monomer (VIII) and the monomer (IX) to be blended with respect to the total 100 mass % of these monomers: the proportion of the monomer (IX) is generally in the range of 20 to 70 mass % and preferably in the range of 30 to 60 mass % in a case where X² in formula (VIII) of the monomer (VIII) is methyl group; and the proportion of the monomer (IX) is generally in the range of 40 to 90 mass % and preferably in the range of 50 to 70 mass % in a case where X² in formula (VIII) of the monomer (VIII) is tert-butyl group. The proportion of the monomer (a) can vary depending on the type of Y in formula (IX) of the monomer (IX).

More specifically, the proportion of the monomer (IX) with respect to the total 100 mass % of the aforementioned monomers is preferably in the range of 20 to 70 mass % in a case where X² in formula (VIII) of the monomer (VIII) is H and Y in formula (IX) of the monomer (IX) is $CH_3$. Or, the proportion of the monomer (IX) with respect to the total 100 mass % of the aforementioned monomers is preferably in the range of 40 to 95 mass % in a case where X² in formula (VIII) of the monomer (VIII) is H and Y in formula (IX) of the monomer (IX) is $C_4H_9$. Or, the proportion of the monomer (IX) with respect to the total 100 mass % of the aforementioned monomers is preferably in the range of 20 to 95 mass % in a case where $X^2$ in formula (VIII) of the monomer (VIII) is $CH_3$ and Y in formula (IX) of the monomer (IX) is $C_4H_9$. Or, the proportion of the monomer (IX) with respect to the total 100 mass % of the aforementioned monomers is preferably in the range of 30 to 95 mass % in a case where $X^2$ in formula (VIII) of the monomer (VIII) is H and Y in formula (IX) of the monomer (IX) is $C_3H_7$. Or, the proportion of the monomer (IX) with respect to the total 100 mass % of the aforementioned monomers is preferably in the range of 10 to 80 mass % in a case where $X^2$ in formula (VIII) of the monomer (VIII) is $C_3H_7$ and Y in formula (IX) of the monomer (IX) is $C_4H_9$.

It is possible to prevent the two types of monomers from disrupting each other's good effects but rather obtain an excellent synergetic effect by these two types of monomers by setting the amounts of the monomers to be blended in the ranges described above. As a result, the rubber composition according to the second aspect of the present invention, obtained by using the aforementioned copolymer resin, is reliably prevented from degrading grip performance in either a relatively high or low temperature range more than is necessary.

The method for polymerization of the copolymer resin according to the second aspect is not particularly restricted and a method similar to the method for polymerization according to the first aspect can be employed for obtaining the resin, except that, after the monomer is mixed with an organic solvent and the mixture is stirred, a catalyst is added dropwise thereto during a period of 10 to 30 minutes in a state where the temperature of the solution is maintained in the range of −10 to 15° C. and preferably in the range of −5 to 10° C. The organic solvent and the catalyst similar to those used in the polymerization method of the first aspect of the invention can be used.

The rubber composition of the present invention is characterized in that a copolymer resin obtained by copolymerizing the monomer (VIII) and the monomer (IX) is blended with the rubber component therein. The characteristics retained by the copolymer resin can be effectively utilized by blending the resin with the rubber component, whereby a tire using the resulting rubber composition can exhibit excellent grip performance in both a relatively high and relatively low temperature ranges. A rubber component similar to the rubber component used in the rubber composition according to the first aspect of the present invention can be employed as the rubber component for use in the rubber composition according to the second aspect to the present invention.

In the present embodiment, an amount of the copolymer resin to be blended in the rubber composition of the present invention is generally in the range of 1 to 100 parts by mass, preferably in the range of 2 to 40 parts by mass, and more preferably in the range of 2 to 20 parts by mass, with respect to 100 parts by mass of the rubber component. The characteristics retained by the resin can be sufficiently exhibited and it is possible to obtain a rubber composition capable of realizing a high-performance tire without marring the characteristics of the rubber component, by setting the amount of the copolymer resin to be blended within the aforementioned range.

In addition to the rubber component and the resin described above, other components similar to those used in the first aspect of the present invention may optionally be blended with the rubber composition according to the second aspect of the present invention within the range which does not adversely affects the object of the present invention. The method of compounding and optionally vulcanizing the respective components is similar to that in the first aspect of the present invention.

[Tire]

Although the rubber composition of the present invention, including those according to the first and second aspects thereof, is not particularly restricted in application, it is preferable to use the rubber composition for tread of a high-performance tire. The tire of the present invention can be produced by using the known members and the known structures, except that the rubber composition of the present invention is to be used. The tire of the present invention may be either a solid tire or a pneumatic tire. Examples of gas which may be used to fill the pneumatic tire therewith include inert gas such as nitrogen, argon and helium, as well as ambient air and air of which oxygen partial pressure has been adjusted.

Examples of the structure of the tire of the present invention include a tire structure having a pair of bead portions, a carcass extending in a toroidal shape from the bead portions, a belt for compressingly hoop-fastening a crown portion of the carcass, and a tread. The tire of the present invention may have either a radial structure or a bias structure.

EXAMPLES

The present invention will be described in detail based on Examples hereinafter. It should be noted that the present invention is not restricted to these Examples. Respective measurement conditions, respective evaluation characteristics and respective evaluation standards are set in terms of the methods described below.

<Measurement of Number-Average Molecular Weight (Mn) and Weight-Average Molecular Weight (Mw)>
Mn and Mw of a resin are measured by GPC in accordance with the measurement conditions described below.
Fluid: tetrahydrofuran
Flow rate: 1 mL/min
Column: "shodex KF-6"+"shodex KF-803"+"shodex KF-802"
Temperature: 40° C.
Injection amount of sample: 50 μL
* "shodex KF-6", "shodex KF-803" and "shodex KF-802" are product names, respectively. Standard polystyrene is used for calibration of molecular weight.
<Measurement of Softening Point>
The softening point is measured according to the ball and ring test prescribed in (JAI) 7-1900.
<Dry Skid Properties>
A resistance value observed when a dry surface is rubbed with a sample piece of vulcanized rubber is measured by a Stanley London-type portable skid resistance tester. The results are expressed as index values relative to the index value of Comparative Example 1-1 being 100 in Examples 1-1 to 1-25 and Comp. Examples 1-1 to 1-9 and index values relative to the index value of Comparative Example 2-1 being 100 in Examples 2-1 to 2-34 and Comp. Examples 2-1 to 2-8. The larger index value represents the better dry skid properties.
<Method of Evaluating Dry Grip Properties>
Dry grip properties are evaluated by: preparing four test tires of size 215/45R17 for each of the aforementioned rubber compositions by using the composition in tread; mounting these tires on four wheels of a passenger vehicle and driving the vehicle on a test course having a dry asphalt road surface; and evaluating grip properties to following seven grades 1-7 based on a test driver's feelings (7: very good, 6: good, 5: slightly good, 4: moderate, 3: slightly poor, 2: poor, 1: very poor, –: not evaluated).

<Grip Properties of Tire in Relatively Low and High Temperature Ranges>

Grip properties of tires are evaluated by: preparing four test tires of size 215/45R17 for each of the obtained rubber compositions by using the composition in tread; mounting these tires on four wheels of a passenger vehicle and driving the vehicle on a test course having a dry asphalt road surface; and evaluating grip properties by a test driver according to the evaluation standards (seven grades) described below. In Examples 1-1 to 1-25 and Comparative Examples 1-1 to 1-9, the results measured under the conditions in which the temperature of the road surface is in the range of 10 to 15° C. are evaluated as dry grip properties at a relatively low temperature and the results measured under the conditions in which the temperature of the road surface is in the range of 30 to 35° C. are evaluated as dry grip properties at a relatively high temperature. Further, in Examples 2-1 to 2-34 and Comparative Examples 2-1 to 2-8, the results measured under the conditions in which the temperature of the road surface is in the range of 10 to 15° C. are evaluated as dry grip properties at a relatively low temperature and the results measured under the conditions in which the temperature of the road surface is in the range of 30 to 35° C. are evaluated as dry grip properties at a relatively high temperature. 7: very good, 6: good, 5: slightly good, 4: moderate, 3: slightly poor, 2: poor, 1: very poor, −: not evaluated

[Preparation of Resin C-1]

A stirring device, a thermometer and a reflux condenser are mounted to a 500 ml four-neck flask. To the four-neck flask, 85.0 g of 4-tert-butyl-α-methylstyrene (manufactured by Hokko Chemical Industry Co., Ltd.), 75.0 g of indene (manufactured by Kanto Chemical Co., Inc.) and 400 ml of Toluene (manufactured by Kanto Chemical Co., Inc.) are charged as a reaction mixed solution and the solution is stirred thoroughly. Thereafter, the reaction mixed solution, which has been uniformly dispersed, is heated up to 34° C. in an oil bath. 1.6 g of boron trifluoride phenol complex and 3.2 g of toluene as catalyst are charged in a dropping funnel and the dropping funnel is mounted to the four-neck flask.

Next, the catalyst is added dropwise to the reaction mixed solution during a period of 15 minutes in a state where the temperature of the reaction mixed solution is maintained in the range of 34 to 37° C., so that a polymerization reaction is started. After dropwise addition of the catalyst is completed, the solution is stirred for further 30 minutes in the state where the temperature of the solution is kept in the range of 34 to 37° C. After the polymerization reaction is completed, the reaction solution is cooled to the room temperature or below it. The resulting reaction solution is washed with an aqueous solution of 0.5N sodium hydroxide and then with water. The reaction solution thus washed is dried by using sodium sulfate anhydrous. The reaction solution thus dried is added dropwise during a period of 30 minutes to 1280 g of methanol prepared in advance, whereby powdery precipitates are obtained. The powder thus obtained is filtered, washed with 300 g of methanol, and dried under a reduced pressure, whereby resin C-1 (4-tert-butyl-α-methylstyrene/indene copolymer resin) is obtained with yield of 80 g. The resin C-1 thus obtained has softening point: 194° C., number-average molecular weight (Mn): 2215, and weight-average molecular weight (Mw): 3117.

[Preparation of Resin D-1]

A resin D-1 is prepared in a manner similar to that of preparing the resin C-1, except that the polymerization temperature is kept in the range of 20 to 23° C. The resin D-1 thus obtained has yield: 112 g, softening point: 210° C., number-average molecular weight (Mn): 3132, and weight-average molecular weight (Mw): 5208.

[Preparation of Resin E-1]

A resin E-1 is prepared in a manner similar to that of preparing the resin C-1, except that 46.0 g of 4-tert-butyl-α-methylstyrene (manufactured by Hokko Chemical Industry Co., Ltd.) and 114.0 g of indene (manufactured by Kanto Chemical Co., Inc.) are polymerized at the polymerization temperature in the range of 68 to 70° C. The resin E-1 thus obtained has yield: 115 g, softening point: 187° C., number-average molecular weight (Mn): 1300, and weight-average molecular weight (Mw): 2203.

[Preparation of Resin F-1]

A resin F-1 is prepared in a manner similar to that of preparing the resin E-1, except that the polymerization temperature is kept in the range of 48 to 50° C. The resin E-1 thus obtained has yield: 141 g, softening point: 197° C., number-average molecular weight (Mn): 2533, and weight-average molecular weight (Mw): 4246.

[Preparation of Resin G-1]

A resin G-1 is prepared in a manner similar to that of preparing the resin C-1, except that 16.0 g of 4-tert-butyl-α-methylstyrene (manufactured by Hokko Chemical Industry Co., Ltd.) and 144.0 g of indene (manufactured by Kanto Chemical Co., Inc.) are polymerized at the polymerization temperature in the range of 90 to 92° C. The resin G-1 thus obtained has yield: 120 g, softening point: 197° C., number-average molecular weight (Mn): 1240, and weight-average molecular weight (Mw): 2109.

[Preparation of Resin H-1]

A resin H-1 is prepared in a manner similar to that of preparing the resin G-1, except that the polymerization temperature is kept in the range of 70 to 73° C. The resin H-1 thus obtained has yield: 145 g, softening point: 207° C., number-average molecular weight (Mn): 24383, and weight-average molecular weight (Mw): 4121.

[Preparation of Resin I-1]

A stirring device, a thermometer and a reflux condenser are mounted to a 500 ml four-neck flask. To the four-neck flask, 81.0 g of α-methylstyrene, 9 g of indene (that is, α-methylstyrene: 90 mass %, indene: 10 mass %) and 240 ml of Toluene are charged as a reaction mixed solution and the solution is stirred thoroughly. 0.9 g of boron trifluoride phenol complex and 9 g of toluene as catalyst are charged in a dropping funnel and the dropping funnel is mounted to the four-neck flask. Thereafter, the catalyst is added dropwise to the reaction mixed solution during a period of 15 minutes in a state where the temperature of the reaction mixed solution, which has been uniformly dispersed, is maintained in the range of 1 to 3° C. by using an alcohol bath cooled with dry ice, so that a polymerization reaction is started. After dropwise addition of the catalyst is completed, the polymerization is allowed to proceed for further 1 hour in the state where the temperature of the solution is kept in the range of 1 to 3° C. Then, the polymerization reaction is stopped by adding an aqueous solution of 0.5N sodium hydroxide to the reaction mixed solution. The reaction product thus obtained is washed with 100 ml of water three times and then the solvent and unreacted monomers are removed under a reduced pressure, whereby an α-methylstyrene/indene copolymer resin is obtained (the yield: 85 g). The α-methylstyrene/indene copolymer resin thus obtained has softening point: 145° C., number-average molecular weight (Mn): 800, and weight-average molecular weight (Mw): 3500.

[Preparation of Resin J-1]

A resin J-1 is prepared in a manner similar to that of preparing the resin I-1, except that 72 g of α-methylstyrene and 18 g of indene (that is, α-methylstyrene: 80 mass %, indene: 20 mass %) are used and that the addition of the catalyst is carried for 15 minutes and the polymerization reaction is allowed to proceed for 1 hour in a state where the temperature of the reaction mixed solution is maintained in the range of 13 to 15° C. The α-methylstyrene/indene copolymer resin thus obtained has yield: 77 g, softening point: 145° C., number-average molecular weight (Mn): 800, and weight-average molecular weight (Mw): 2000.

[Preparation of Resin K-1]

A resin K-1 is prepared in a manner similar to that of preparing the resin I-1, except that 54 g of α-methylstyrene and 36 g of indene (that is, α-methylstyrene: 60 mass %, indene:

40 mass %) are used and that the addition of the catalyst is carried for 15 minutes and the polymerization reaction is allowed to proceed for 1 hour in a state where the temperature of the reaction mixed solution is maintained in the range of 34 to 36° C. The α-methylstyrene/indene copolymer resin thus obtained has yield: 76 g, softening point: 146° C., number-average molecular weight (Mn): 700, and weight-average molecular weight (Mw): 1300.

[Preparation of Resin L-1]

A resin L-1 is prepared in a manner similar to that of preparing the resin I-1, except that 72 g of α-methylstyrene and 18 g of indene (that is, α-methylstyrene: 80 mass %, indene: 20 mass %) are used and that the addition of the catalyst is carried for 15 minutes and the polymerization reaction is allowed to proceed for 1 hour in a state where the temperature of the reaction mixed solution is maintained in the range of 6 to 8° C. The α-methylstyrene/indene copolymer resin thus obtained has yield: 79 g, softening point: 170° C., number-average molecular weight (Mn): 1000, and weight-average molecular weight (Mw): 3500.

[Preparation of Resin M-1]

A resin M-1 is prepared in a manner similar to that of preparing the resin I-1, except that 54 g of α-methylstyrene and 36 g of indene (that is, α-methylstyrene: 60 mass %, indene: 40 mass %) are used and that the addition of the catalyst is carried for 15 minutes and the polymerization reaction is allowed to proceed for 1 hour in a state where the temperature of the reaction mixed solution is maintained in the range of 10 to 15° C. The α-methylstyrene/indene copolymer resin thus obtained has yield: 86 g, softening point: 165° C., number-average molecular weight (Mn): 1000, and weight-average molecular weight (Mw): 3000.

[Preparation of Resin N-1]

A resin N-1 is prepared in a manner similar to that of preparing the resin I-1, except that 36 g of α-methylstyrene and 54 g of indene (that is, α-methylstyrene: 40 mass %, indene: 60 mass %) are used and that the addition of the catalyst is carried for 15 minutes and the polymerization reaction is allowed to proceed for 1 hour in a state where the temperature of the reaction mixed solution is maintained in the range of 54 to 56° C. The α-methylstyrene/indene copolymer resin thus obtained has yield: 80 g, softening point: 144° C., number-average molecular weight (Mn): 680, and weight-average molecular weight (Mw): 1100.

[Preparation of Resin O-1]

A resin O-1 is prepared in a manner similar to that of preparing the resin I-1, except that 54 g of α-methylstyrene and 36 g of indene (that is, α-methylstyrene: 60 mass %, indene: 40 mass %) are used and that the addition of the catalyst is carried for 15 minutes and the polymerization reaction is allowed to proceed for 1 hour in a state where the temperature of the reaction mixed solution is maintained in the range of 5 to 8° C. The α-methylstyrene/indene copolymer resin thus obtained has yield: 80 g, softening point: 190° C., number-average molecular weight (Mn): 1500, and weight-average molecular weight (Mw): 4000.

[Preparation of Resin P-1]

A resin P-1 is prepared in a manner similar to that of preparing the resin I-1, except that 54 g of α-methylstyrene and 36 g of indene (that is, α-methylstyrene: 60 mass %, indene: 40 mass %) are used and that the addition of the catalyst is carried for 15 minutes and the polymerization reaction is allowed to proceed for 1 hour in a state where the temperature of the reaction mixed solution is maintained in the range of 60 to 63° C. The α-methylstyrene/indene copolymer resin thus obtained has yield: 70 g, softening point: 95° C., number-average molecular weight (Mn): 350, and weight-average molecular weight (Mw): 500.

[Preparation of Resin Q-1]

A resin Q-1 is prepared in a manner similar to that of preparing the resin I-1, except that 72 g of α-methylstyrene and 18 g of indene (that is, α-methylstyrene: 80 mass %, indene: 20 mass %) are used and that the addition of the catalyst is carried for 15 minutes and the polymerization reaction is allowed to proceed for 1 hour in a state where the temperature of the reaction mixed solution is maintained in the range of −1 to 1° C. The α-methylstyrene/indene copolymer resin thus obtained has yield: 81 g, softening point: 190° C., number-average molecular weight (Mn): 1300, and weight-average molecular weight (Mw): 5500.

[Preparation of Resin S-1]

A resin S-1 is prepared in a manner similar to that of preparing the resin C-1, except that 8.0 g of 4-tert-butyl-α-methylstyrene (manufactured by Hokko Chemical Industry Co., Ltd.) and 152.0 g of indene (manufactured by Kanto Chemical Co., Inc.) are polymerized at the polymerization temperature in the range of 94 to 95° C. The resin S-1 thus obtained has yield: 118 g, softening point: 200° C., number-average molecular weight (Mn): 1230, and weight-average molecular weight (Mw): 2091.

[Preparation of Resin T-1]

A resin T-1 is prepared in a manner similar to that of preparing the resin C-1, except that 152.0 g of 4-tert-butyl-α-methylstyrene (manufactured by Hokko Chemical Industry Co., Ltd.) and 8.0 g of indene (manufactured by Kanto Chemical Co., Inc.) are polymerized at the polymerization temperature in the range of 4 to 6° C. The resin T-1 thus obtained has yield: 72 g, softening point: 143° C., number-average molecular weight (Mn): 1642, and weight-average molecular weight (Mw): 3120.

Examples 1-1 to 1-25 and Comparative Examples 1-1 and 1-9

Each of the respective types of rubber compositions was compounded for mixing, by using a Banbury mixer, according to the blending protocols (parts by mass) shown in Tables 2 to 7 below. The resulting rubber composition was vulcanized at 145° C. for 45 minutes and thereafter test pneumatic tires of size 215/45R17 were prepared by using the vulcanized rubber composition in tire tread. Dry skid properties, dry grip properties at a relatively low temperature and dry grip properties at a relatively high temperature were analyzed the according to the methods described above. The results are shown in Tables 2 to 7. The resins C-1 to Q-1 and S-1 to T-1 in these Tables were prepared according to the methods described above. The blending protocols, the softening points, Mws and Mns of aromatic oil and resins A-1 to T-1 are shown in Table 1.

TABLE 1

|  | a (mass) % *1 | b (mass) % *2 | (a + b) (mass) % *3 | Softening point (° C.) | Mw | Mn |
|---|---|---|---|---|---|---|
| Aromatic oil | — | — | — | — | 300 | — |
| Resin A-1 *4 | <10 | — | — | 120 | 1400 | — |
| Resin B-1 *5 | <1 | — | — | 120 | — | — |
| Resin C-1 *6 | 53 | 47 | 100 | 194 | 3117 | 2215 |
| Resin D-1 *7 | 53 | 47 | 100 | 210 | 5208 | 3132 |
| Resin E-1 *8 | 29 | 71 | 100 | 187 | 2203 | 1300 |
| Resin F-1 *9 | 29 | 71 | 100 | 197 | 4246 | 2533 |
| Resin G-1 *10 | 10 | 90 | 100 | 197 | 2109 | 1240 |
| Resin H-1 *11 | 10 | 90 | 100 | 207 | 4121 | 2438 |
| Resin I-1 *12 | 90 | 10 | 100 | 145 | 3600 | 800 |
| Resin J-1 *13 | 80 | 20 | 100 | 145 | 2000 | 800 |
| Resin K-1 *14 | 60 | 40 | 100 | 146 | 1300 | 700 |
| Resin L-1 *15 | 80 | 20 | 100 | 170 | 3500 | 1000 |
| Resin M-1 *16 | 60 | 40 | 100 | 165 | 3000 | 1000 |
| Resin N-1 *17 | 40 | 60 | 100 | 144 | 1100 | 680 |
| Resin O-1 *18 | 60 | 40 | 100 | 190 | 4000 | 1500 |
| Resin P-1 *19 | 60 | 40 | 100 | 95 | 500 | 350 |
| Resin Q-1 *20 | 80 | 20 | 100 | 190 | 5500 | 1300 |
| Resin R-1 *21 | 100 | 0 | 100 | 120 | 2320 | 1300 |
| Resin S-1 *22 | 5 | 95 | 100 | 200 | 2091 | 1230 |
| Resin T-1 *23 | 95 | 5 | 100 | 143 | 3120 | 1642 |

TABLE 2

|  |  | Comp. Example 1-1 | Comp. Example 1-2 | Comp. Example 1-3 | Comp. Example 1-4 | Comp. Example 1-5 |
|---|---|---|---|---|---|---|
| Styrene-butadiene copolymer rubber *24 | Parts by mass | 100 | 100 | 100 | 100 | 100 |
| Carbon black *25 |  | 70 | 70 | 70 | 70 | 70 |
| Stearic acid |  | 2 | 2 | 2 | 2 | 2 |
| Zinc white |  | 2.5 | 2.5 | 2.5 | 2.5 | 2.5 |
| Anti-aging agent *26 |  | 1.2 | 1.2 | 1.2 | 1.2 | 1.2 |
| Vulcanization accelerator A *27 |  | 1.2 | 1.2 | 1.2 | 1.2 | 1.2 |
| Vulcanization accelerator B *28 |  | 1.2 | 1.2 | 1.2 | 1.2 | 1.2 |
| Sulfur |  | 1.5 | 1.5 | 1.5 | 1.5 | 1.5 |
| Aromatic oil |  | 10 | — | — | — | — |
| Resin A-1 *4 |  | — | 10 | — | — | — |
| Resin B-1 *5 |  | — | — | 10 | — | — |
| Resin C-1 *6 |  | — | — | — | 110 | 0.5 |
| Test results | Dry skid properties | Index value | 100 | 95 | 90 | 94 | 94 |
|  | Dry grip properties at low temperature |  | 5 | 2 | 1 | 2 | 2 |
|  | Dry grip properties at high temperature |  | 2 | 4 | 5 | 3 | 3 |

TABLE 3

|  |  | Example 1-1 | Example 1-2 | Example 1-3 | Example 1-4 | Example 1-5 |
|---|---|---|---|---|---|---|
| Styrene-butadiene copolymer rubber *24 | Parts by mass | 100 | 100 | 100 | 100 | 100 |
| Carbon black *25 |  | 70 | 70 | 70 | 70 | 70 |
| Stearic acid |  | 2 | 2 | 2 | 2 | 2 |
| Zinc white |  | 2.5 | 2.5 | 2.5 | 2.5 | 2.5 |
| Anti-aging agent *26 |  | 1.2 | 1.2 | 1.2 | 1.2 | 1.2 |
| Vulcanization accelerator A *27 |  | 1.2 | 1.2 | 1.2 | 1.2 | 1.2 |
| Vulcanization accelerator B *28 |  | 1.2 | 1.2 | 1.2 | 1.2 | 1.2 |
| Sulfur |  | 1.5 | 1.5 | 1.5 | 1.5 | 1.5 |
| Aromatic oil |  | — | — | — | — | — |
| Resin A-1 *4 |  | — | — | — | — | — |
| Resin B-1 *5 |  | — | — | — | — | — |
| Resin C-1 *6 |  | 1 | 10 | 20 | 50 | 100 |
| Test results | Dry skid properties | Index value | 101 | 104 | 105 | 102 | 102 |
|  | Dry grip properties at low temperature |  | 5 | 5 | 5 | 5 | 5 |
|  | Dry grip properties at high temperature |  | 3 | 5 | 6 | 6 | 6 |

TABLE 4

|  |  | Example 1-2 | Example 1-6 | Example 1-7 | Example 1-8 | Example 1-9 | Example 1-10 | Example 1-11 | Example 1-12 |
|---|---|---|---|---|---|---|---|---|---|
| Styrene-butadiene copolymer rubber | Parts by mass | 100 | 100 | 100 | 100 | 100 | 100 | 100 | 100 |
| Carbon black *25 | | 70 | 70 | 70 | 70 | 70 | 70 | 70 | 70 |
| Stearic acid | | 2.5 | 2.5 | 2.5 | 2.5 | 2.5 | 2.5 | 2.5 | 2.5 |
| Zinc white | | 1.2 | 1.2 | 1.2 | 1.2 | 1.2 | 1.2 | 1.2 | 1.2 |
| Anti-aging agent *26 | | 1.2 | 1.2 | 1.2 | 1.2 | 1.2 | 1.2 | 1.2 | 1.2 |
| Vulcanization accelerator A *27 | | 1.2 | 1.2 | 1.2 | 1.2 | 1.2 | 1.2 | 1.2 | 1.2 |
| Vulcanization accelerator B *28 | | 1.2 | 1.2 | 1.2 | 1.2 | 1.2 | 1.2 | 1.2 | 1.2 |
| Sulfur | | 1.2 | 1.2 | 1.2 | 1.2 | 1.2 | 1.2 | 1.2 | 1.2 |
| Resin C-1 *6 | | 10 | — | — | — | — | — | — | — |
| Resin D-1 *7 | | — | 10 | — | — | — | — | — | — |
| Resin E-1 *8 | | — | — | 10 | — | — | — | — | — |
| Resin F-1 *9 | | — | — | — | 10 | — | — | — | — |
| Resin G-1 *10 | | — | — | — | — | 10 | — | — | — |
| Resin H-1 *11 | | — | — | — | — | — | 10 | — | — |
| Resin S-1 *22 | | — | — | — | — | — | — | 10 | — |
| Resin T-1 *23 | | — | — | — | — | — | — | — | 10 |
| Test results | Dry skid properties | Index value | 104 | 103 | 106 | 104 | 101 | 101 | 101 | 104 |
| | Dry grip properties at low temperature | | 5 | 5 | 6 | 4 | 4 | 4 | 4 | 6 |
| | Dry grip properties at high temperature | | 5 | 6 | 6 | 7 | 7 | 7 | 5 | 4 |

TABLE 5

|  |  | Comp. Example 1-1 | Comp. Example 1-2 | Comp. Example 1-3 | Example 1-13 | Comp. Example 1-6 |
|---|---|---|---|---|---|---|
| Styrene-butadiene copolymer rubber *24 | Parts by mass | 100 | 100 | 100 | 100 | 100 |
| Carbon black *25 | | 70 | 70 | 70 | 70 | 70 |
| Stearic acid | | 2 | 2 | 2 | 2 | 2 |
| Zinc white | | 2.5 | 2.5 | 2.5 | 2.5 | 2.5 |
| Anti-aging agent *26 | | 1.2 | 1.2 | 1.2 | 1.2 | 1.2 |
| Vulcanization accelerator A *27 | | 1.2 | 1.2 | 1.2 | 1.2 | 1.2 |
| Vulcanization accelerator B *28 | | 1.2 | 1.2 | 1.2 | 1.2 | 1.2 |
| Sulfur | | 1.5 | 1.5 | 1.5 | 1.5 | 1.5 |
| Aromatic oil | | 10 | — | — | — | — |
| Resin A-1 *4 | | — | 10 | — | — | — |
| Resin B-1 *5 | | — | — | 10 | — | — |
| Resin I-1 *12 | | — | — | — | 10 | 110 |
| Resin J-1 *13 | | — | — | — | — | — |
| Resin K-1 *14 | | — | — | — | — | — |
| Test results | Dry skid properties | Index value | 100 | 97 | 94 | 104 | 94 |
| | Dry grip properties at low temperature | | 5 | 2 | 1 | 6 | 2 |
| | Dry grip properties at high temperature | | 2 | 4 | 5 | 5 | 3 |

TABLE 6

|  |  | Example 1-14 | Example 1-15 | Example 1-16 | Example 1-17 | Example 1-18 | Example 1-19 | Comp. Example 1-7 | Comp. Example 1-8 |
|---|---|---|---|---|---|---|---|---|---|
| Styrene-butadiene copolymer rubber | Parts by mass | 100 | 100 | 100 | 100 | 100 | 100 | 100 | 100 |
| Carbon black *25 | | 70 | 70 | 70 | 70 | 70 | 70 | 70 | 70 |
| Stearic acid | | 2 | 2 | 2 | 2 | 2 | 2 | 2 | 2 |
| Zinc white | | 2.5 | 2.5 | 2.5 | 2.5 | 2.5 | 2.5 | 2.5 | 2.5 |

TABLE 6-continued

|  |  | Example 1-14 | Example 1-15 | Example 1-16 | Example 1-17 | Example 1-18 | Example 1-19 | Comp. Example 1-7 | Comp. Example 1-8 |
|---|---|---|---|---|---|---|---|---|---|
| Anti-aging agent *26 |  | 1.2 | 1.2 | 1.2 | 1.2 | 1.2 | 1.2 | 1.2 | 1.2 |
| Vulcanization accelerator A *27 |  | 1.2 | 1.2 | 1.2 | 1.2 | 1.2 | 1.2 | 1.2 | 1.2 |
| Vulcanization accelerator B *28 |  | 1.2 | 1.2 | 1.2 | 1.2 | 1.2 | 1.2 | 1.2 | 1.2 |
| Sulfur |  | 1.5 | 1.5 | 1.5 | 1.5 | 1.5 | 1.5 | 1.5 | 1.5 |
| Aromatic oil |  | — | — | — | — | — | — | — | — |
| Resin A-1 *4 |  | — | — | — | — | — | — | — | — |
| Resin B-1 *5 |  | — | — | — | — | — | — | — | — |
| Resin I-1 *12 |  | — | — | — | — | — | — | — | — |
| Resin J-1 *13 |  | 10 | — | — | — | — | — | — | — |
| Resin K-1 *14 |  | — | 1 | 10 | 20 | 50 | 100 | 0.5 | 110 |
| Test results | Dry skid properties | Index value | 105 | 101 | 103 | 104 | 95 | 89 | 94 | 94 |
|  | Dry grip properties at low temperature |  | 6 | 5 | 5 | 5 | 4 | 3 | 2 | 2 |
|  | Dry grip properties at high temperature |  | 5 | 3 | 6 | 7 | 7 | 7 | 3 | 6 |

Note: Row "Test results / Dry skid properties / Index value" has values: 105, 101, 103, 104, 95, 89, 94, 94.

TABLE 7

|  |  |  | Example 1-20 | Example 1-21 | Example 1-22 | Example 1-23 | Example 1-24 | Example 1-25 | Comp. Example 1-9 |
|---|---|---|---|---|---|---|---|---|---|
| Styrene-butadiene copolymer rubber | Parts by mass |  | 100 | 100 | 100 | 100 | 100 | 100 | 100 |
| Carbon black *25 |  |  | 70 | 70 | 70 | 70 | 70 | 70 | 70 |
| Stearic acid |  |  | 2 | 2 | 2 | 2 | 2 | 2 | 2 |
| Zinc white |  |  | 2.5 | 2.5 | 2.5 | 2.5 | 2.5 | 2.5 | 2.5 |
| Anti-aging agent *26 |  |  | 1.2 | 1.2 | 1.2 | 1.2 | 1.2 | 1.2 | 1.2 |
| Vulcanization accelerator A *27 |  |  | 1.2 | 1.2 | 1.2 | 1.2 | 1.2 | 1.2 | 1.2 |
| Vulcanization accelerator B *28 |  |  | 1.2 | 1.2 | 1.2 | 1.2 | 1.2 | 1.2 | 1.2 |
| Sulfur |  |  | 1.5 | 1.5 | 1.5 | 1.5 | 2 | 1.5 | 1.5 |
| Resin L-1 *15 |  |  | 10 | — | — | — | — | — | — |
| Resin M-1 *16 |  |  | — | 10 | — | — | — | — | — |
| Resin N-1 *17 |  |  | — | — | 10 | — | — | — | — |
| Resin O-1 *18 |  |  | — | — | — | 10 | — | — | — |
| Resin P-1 *19 |  |  | — | — | — | — | 10 | — | — |
| Resin Q-1 *20 |  |  | — | — | — | — | — | 10 | — |
| Resin R-1 *21 |  |  | — | — | — | — | — | — | 5 |
| Resin A-1 *4 |  |  | — | — | — | — | — | — | 5 |
| Test results | Dry skid properties | Index value | 103 | 101 | 99 | 95 | 104 | 100 | 99 |
|  | Dry grip properties at low temperature |  | 5 | 4 | 3 | 3 | 5 | 4 | 3 |
|  | Dry grip properties at high temperature |  | 7 | 7 | 6 | 7 | 4 | 6 | 4 |

*1 Proportion of α-methylstyrene ("a" mass %) in polymerization of α-methylstyrene/indene copolymer
*2 Proportion of indene ("b" mass %) in polymerization of α-methylstyrene/indene copolymer
*3 Sum of proportion of α-methylstyrene and proportion of indene ("a + b" mass %) in polymerization of α-methylstyrene/indene copolymer
*4 "Neopolymer 120", which is a $C_9$ resin containing indene and having softening point of 120° C., produced by Nippon Oil Corporation
*5 "Esculon V120", which is a coumarone indene resin having softening point of 120° C., produced by Nippon Steel Chemical Co., Ltd.
*6 4-tert-butyl-α-methylstyrene/indene copolymer resin C-1 prepared by the aforementioned method
*7 4-tert-butyl-α-methylstyrene/indene copolymer resin D-1 prepared by the aforementioned method
*8 4-tert-butyl-α-methylstyrene/indene copolymer resin E-1 prepared by the aforementioned method
*9 4-tert-butyl-α-methylstyrene/indene copolymer resin F-1 prepared by the aforementioned method
*10 4-tert-butyl-α-methylstyrene/indene copolymer resin G-1 prepared by the aforementioned method
*11 4-tert-butyl-α-methylstyrene/indene copolymer resin H-1 prepared by the aforementioned method
*12 α-methylstyrene/indene copolymer resin I-1 prepared by the aforementioned method
*13 α-methylstyrene/indene copolymer resin J-1 prepared by the aforementioned method
*14 α-methylstyrene/indene copolymer resin K-1 prepared by the aforementioned method
*15 α-methylstyrene/indene copolymer resin L-1 prepared by the aforementioned method
*16 α-methylstyrene/indene copolymer resin M-1 prepared by the aforementioned method TABLE 7-continued

|  | Example 1-20 | Example 1-21 | Example 1-22 | Example 1-23 | Example 1-24 | Example 1-25 | Comp. Example 1-9 |
|---|---|---|---|---|---|---|---|

*17 α-methylstyrene/indene copolymer resin N-1 prepared by the aforementioned method
*18 α-methylstyrene/indene copolymer resin O-1 prepared by the aforementioned method
*19 α-methylstyrene/indene copolymer resin P-1 prepared by the aforementioned method
*20 α-methylstyrene/indene copolymer resin Q-1 prepared by the aforementioned method
*21 "FTR0120", which is an α-methylstyrene resin (resin R-1) manufactured by Mitsui Chemicals, Inc.
*22 α-methylstyrene/indene copolymer resin S-1 prepared by the aforementioned method
*23 α-methylstyrene/indene copolymer resin T-1 prepared by the aforementioned method
*24 "#1500", manufactured by JSR Corporation
*25 SAF ($N_2SA$: 150 $m^2/g$)
*26 N-1,3-dimethyl-butyl-N'-phenyl-p-phenylenediamine
*27 N-t-butyl-2-benzothiazyl-sulfenamide
*28 Tetrakis-2-ethylhexyl thiraum disulfide From Tables 2 to 7, it is understood that the rubber compositions of Examples, containing an α-methylstyrene/indene copolymer resin or a 4-tert-butyl-α-methylstyrene/indene copolymer resin by a predetermined range of content, and the tires using these rubber compositions exhibit improvement in dry skid properties and dry grip properties at a relatively low temperature and a relatively high temperature, as compared with the tires produced by using the rubber compositions of Comparative Examples, which either do not contain these copolymer resins or contain them by contents beyond the predetermined range. The differences between Examples and Comp. Examples are clear, in particular, by comparing those containing the same resins, e.g. Examples 1-1 to 1-5 vs. Comp. Examples 1-4 to 1-5, or Examples 1-15 to 1-19 vs. Comp. Examples 1-7 to 1-8.

The tire of Example 1-24, produced by using a rubber composition in which resin P-1 having the softening point of 95° C. and the weight-average molecular weight (Mw) of 500 is blended, exhibits poor balance between dry skid properties and dry grip properties at a low temperature and a high temperature of tire, as compared with the tires of other Examples. From this result, the softening point of the α-methylstyrene/indene copolymer resin is preferably in the range of 100 to 170° C. Further, it is preferable to produce a tire by using a rubber composition satisfying the aforementioned content ranges.

[Resin A-2a]

A commercial product ("FTR0100" having softening point: 100° C., number-average molecular weight (Mn): 990 and weight-average molecular weight (Mw): 1960, manufactured by Mitsui Chemicals, Inc.) is used as resin A-2a (α-methylstyrene homopolymer).

[Preparation of Resin B-2a]

A stirring device, a thermometer and a reflux condenser are mounted to a 500 ml four-neck flask. To the four-neck flask, 80.0 g of 4, α-dimethylstyrene (manufactured by Hokko Chemical Industry Co., Ltd.) and 200 ml of Toluene (manufactured by Kanto Chemical Co., Inc.) are charged as a reaction mixed solution and the solution is stirred thoroughly. Thereafter, the reaction mixed solution, which has been uniformly dispersed, is cooled to 10° C. by using an alcoholic bath cooled by dry ice. 0.8 g of boron trifluoride phenol complex and 8 g of toluene as catalyst are charged in a dropping funnel and the dropping funnel is mounted to the four-neck flask.

Next, the catalyst is added dropwise to the reaction mixed solution during a period of 15 minutes in a state where the temperature of the reaction mixed solution is maintained in the range of 10 to 12° C. by using the alcohol bath, so that a polymerization reaction is started. After dropwise addition of the catalyst is completed, the solution is stirred for further 30 minutes in the state where the temperature of the solution is kept in the range of 10 to 12° C. After the polymerization reaction is completed, 100 ml of toluene is added to the reaction mixed solution and the resulting mixed solution is added dropwise to 320 g of methanol prepared in advance during a period of 30 minutes, whereby powdery precipitates are obtained. The powder is filtered and dried under a reduced pressure, to obtain resin B-2a (a 4, α-dimethylstyrene homopolymer) with yield of 40 g. The resin thus obtained has softening point: 140° C., number-average molecular weight (Mn): 640, and weight-average molecular weight (Mw): 1600.

[Preparation of Resin C-2a]

A resin C-2a is prepared in a manner similar to that of preparing the resin B-2a, except that 48 g of α-methylstyrene (manufactured by Kanto Chemical Co., Inc.) and 32 g of 4, α-dimethylstyrene are used in place of 80 g of 4, α-dimethylstyrene and that the dropwise addition of the catalyst is carried for 15 minutes and the polymerization reaction is allowed to proceed for 30 minutes in a state where the temperature of the reaction mixed solution is maintained in the range of 7 to 8° C. The resin C-2a thus obtained (α-methylstyrene/4, α-dimethylstyrene copolymer) has yield: 42 g, softening point: 152° C., number-average molecular weight (Mn): 1200, and weight-average molecular weight (Mw): 3200.

[Preparation of Resin D-2a]

A resin D-2a is prepared in a manner similar to that of preparing the resin B-2a, except that 48 g of α-methylstyrene and 32 g of 4, α-dimethylstyrene are used in place of 80 g of 4, α-dimethylstyrene and that the dropwise addition of the catalyst is carried for 15 minutes and the polymerization reaction is allowed to proceed for 30 minutes in a state where the temperature of the reaction mixed solution is maintained in the range of 1 to 2° C. The resin D-2a thus obtained (α-methylstyrene/4, α-dimethylstyrene copolymer) has yield: 55 g, softening point: 162° C., number-average molecular weight (Mn): 1400, and weight-average molecular weight (Mw): 4100.

[Preparation of Resin E-2a]

A resin E-2a is prepared in a manner similar to that of preparing the resin B-2a, except that 48 g of α-methylstyrene and 32 g of 4, α-dimethylstyrene are used in place of 80 g of 4, α-dimethylstyrene and that the dropwise addition of the catalyst is carried for 15 minutes and the polymerization reaction is allowed to proceed for 30 minutes in a state where the temperature of the reaction mixed solution is maintained in the range of −6 to −4° C. The resin E-2a thus obtained (α-methylstyrene/4, α-dimethylstyrene copolymer) has yield: 55 g, softening point: 181° C., number-average molecular weight (Mn): 1300, and weight-average molecular weight (Mw): 5100.

[Preparation of Resin F-2a]

A resin F-2a is prepared in a manner similar to that of preparing the resin B-2a, except that 48 g of α-methylstyrene and 32 g of 4, α-dimethylstyrene are used in place of 80 g of 4, α-dimethylstyrene and that the dropwise addition of the catalyst is carried for 15 minutes and the polymerization reaction is allowed to proceed for 30 minutes in a state where the temperature of the reaction mixed solution is maintained in the range of 10 to 11° C. The resin F-2a thus obtained (α-methylstyrene/4, α-dimethylstyrene copolymer) has yield: 30 g, softening point: 125° C., number-average molecular weight (Mn): 970, and weight-average molecular weight (Mw): 1900.

[Preparation of Resin G-2a]

A resin G-2a is prepared in a manner similar to that of preparing the resin B-2a, except that 56 g of α-methylstyrene and 24 g of 4, α-dimethylstyrene are used in place of 80 g of 4, α-dimethylstyrene and that the dropwise addition of the catalyst is carried for 15 minutes and the polymerization reaction is allowed to proceed for 30 minutes in a state where the temperature of the reaction mixed solution is maintained in the range of 5 to 7° C. The resin G-2a thus obtained (α-methylstyrene/4, α-dimethylstyrene copolymer) has yield: 45 g, softening point: 138° C., number-average molecular weight (Mn): 1100, and weight-average molecular weight (Mw): 3100.

[Preparation of Resin H-2a]

A resin H-2a is prepared in a manner similar to that of preparing the resin B-2a, except that 40 g of α-methylstyrene and 40 g of 4, α-dimethylstyrene are used in place of 80 g of 4, α-dimethylstyrene and that the dropwise addition of the catalyst is carried for 15 minutes and the polymerization reaction is allowed to proceed for 30 minutes in a state where the temperature of the reaction mixed solution is maintained in the range of 9 to 10° C. The resin H-2a thus obtained (α-methylstyrene/4, α-dimethylstyrene copolymer) has yield: 43 g, softening point: 165° C., number-average molecular weight (Mn): 1070, and weight-average molecular weight (Mw): 3000.

[Preparation of Resin I-2a]

A resin I-2a is prepared in a manner similar to that of preparing the resin B-2a, except that 24 g of α-methylstyrene and 56 g of 4, α-dimethylstyrene are used in place of 80 g of 4, α-dimethylstyrene and that the dropwise addition of the catalyst is carried for 15 minutes and the polymerization reaction is allowed to proceed for 30 minutes in a state where the temperature of the reaction mixed solution is maintained in the range of 5 to 6° C. The resin I-2a thus obtained (α-methylstyrene/4, α-dimethylstyrene copolymer) has yield: 52 g, softening point: 184° C., number-average molecular weight (Mn): 1400, and weight-average molecular weight (Mw): 4200.

[Preparation of Resin J-2a]

A resin J-2a is prepared in a manner similar to that of preparing the resin B-2a, except that 8 g of α-methylstyrene and 72 g of 4, α-dimethylstyrene are used in place of 80 g of 4, α-dimethylstyrene and that the dropwise addition of the catalyst is carried for 15 minutes and the polymerization reaction is allowed to proceed for 30 minutes in a state where the temperature of the reaction mixed solution is maintained in the range of 7 to 10° C. The resin J-2a thus obtained (α-methylstyrene/4, α-dimethylstyrene copolymer) has yield: 40 g, softening point: 148° C., number-average molecular weight (Mn): 1150, and weight-average molecular weight (Mw): 3100.

[Preparation of Resin K-2a]

A resin K-2a is prepared in a manner similar to that of preparing the resin B-2a, except that 72 g of α-methylstyrene and 8 g of 4, α-dimethylstyrene are used in place of 80 g of 4, α-dimethylstyrene and that the dropwise addition of the catalyst is carried for 15 minutes and the polymerization reaction is allowed to proceed for 30 minutes in a state where the temperature of the reaction mixed solution is maintained in the range of 5 to 7° C. The resin K-2a thus obtained (α-methylstyrene/4, α-dimethylstyrene copolymer) has yield: 42 g, softening point: 138° C., number-average molecular weight (Mn): 1100, and weight-average molecular weight (Mw): 3000.

[Preparation of Resin L-2a]

A resin L-2a is prepared in a manner similar to that of preparing the resin B-2a, except that 72 g of α-methylstyrene and 8 g of 4-tert-butyl-α-methylstyrene (manufactured by Hokko Chemical Industry Co., Ltd.) are used in place of 80 g of 4, α-dimethylstyrene and that the dropwise dropwise addition of the catalyst is carried for 15 minutes and the polymerization reaction is allowed to proceed for 30 minutes in a state where the temperature of the reaction mixed solution is maintained in the range of 1 to 2° C. The resin L-2a thus obtained (α-methylstyrene/4-tert-butyl-α-methylstyrene copolymer) has yield: 50 g, softening point: 153° C., number-average molecular weight (Mn): 1350, and weight-average molecular weight (Mw): 3900.

[Preparation of Resin M-2a]

A resin M-2a is prepared in a manner similar to that of preparing the resin B-2a, except that 72 g of α-methylstyrene and 8 g of 4-tert-butyl-α-methylstyrene are used in place of 80 g of 4, α-dimethylstyrene and that the dropwise dropwise addition of the catalyst is carried for 15 minutes and the polymerization reaction is allowed to proceed for 30 minutes in a state where the temperature of the reaction mixed solution is maintained in the range of −4 to −3° C. The resin M-2a thus obtained (α-methylstyrene/4-tert-butyl-α-methylstyrene copolymer) has yield: 65 g, softening point: 153° C., number-average molecular weight (Mn): 1300, and weight-average molecular weight (Mw): 4900.

[Preparation of Resin N-2a]

A resin N-2a is prepared in a manner similar to that of preparing the resin B-2a, except that 72 g of α-methylstyrene and 8 g of 4-tert-butyl-α-methylstyrene are used in place of 80 g of 4, α-dimethylstyrene and that the dropwise dropwise addition of the catalyst is carried for 15 minutes and the polymerization reaction is allowed to proceed for 30 minutes in a state where the temperature of the reaction mixed solution is maintained in the range of 10 to 11° C. The resin N-2a thus obtained (α-methylstyrene/4-tert-butyl-α-methylstyrene copolymer) has yield: 35 g, softening point: 130° C., number-average molecular weight (Mn): 870, and weight-average molecular weight (Mw): 2100.

[Preparation of Resin O-2a]

A resin O-2a is prepared in a manner similar to that of preparing the resin B-2a, except that 64 g of α-methylstyrene and 16 g of 4-tert-butyl-α-methylstyrene are used in place of 80 g of 4, α-dimethylstyrene and that the dropwise dropwise addition of the catalyst is carried for 15 minutes and the polymerization reaction is allowed to proceed for 30 minutes in a state where the temperature of the reaction mixed solution is maintained in the range of 3 to 4° C. The resin O-2a thus obtained (α-methylstyrene/4-tert-butyl-α-methylstyrene copolymer) has yield: 50 g, softening point: 165° C., number-average molecular weight (Mn): 1350, and weight-average molecular weight (Mw): 40000.

[Preparation of Resin P-2a]

A resin P-2a is prepared in a manner similar to that of preparing the resin B-2a, except that 48 g of α-methylstyrene and 32 g of 4-tert-butyl-α-methylstyrene are used in place of 80 g of 4, α-dimethylstyrene and that the dropwise dropwise addition of the catalyst is carried for 15 minutes and the polymerization reaction is allowed to proceed for 30 minutes in a state where the temperature of the reaction mixed solution is maintained in the range of 4 to 5° C. The resin P-2a thus obtained (α-methylstyrene/4-tert-butyl-α-methylstyrene copolymer) has yield: 48 g, softening point: 170° C., number-average molecular weight (Mn): 1300, and weight-average molecular weight (Mw): 4000.

[Preparation of Resin Q-2a]

A resin Q-2a is prepared in a manner similar to that of preparing the resin B-2a, except that 32 g of α-methylstyrene and 48 g of 4-tert-butyl-α-methylstyrene are used in place of 80 g of 4, α-dimethylstyrene and that the dropwise dropwise addition of the catalyst is carried for 15 minutes and the polymerization reaction is allowed to proceed for 30 minutes in a state where the temperature of the reaction mixed solution is maintained in the range of 4 to 6° C. The resin Q-2a thus obtained (α-methylstyrene/4-tert-butyl-α-methylstyrene copolymer) has yield: 48 g, softening point: 175° C., number-average molecular weight (Mn): 1350, and weight-average molecular weight (Mw): 4100.

[Preparation of Resin R-2a]

A resin R-2a is prepared in a manner similar to that of preparing the resin B-2a, except that 8 g of α-methylstyrene and 72 g of 4-tert-butyl-α-methylstyrene are used in place of 80 g of 4, α-dimethylstyrene and that the dropwise dropwise addition of the catalyst is carried for 15 minutes and the polymerization reaction is allowed to proceed for 30 minutes in a state where the temperature of the reaction mixed solution is maintained in the range of 5 to 6° C. The resin R-2a thus obtained (α-methylstyrene/4-tert-butyl-α-methylstyrene copolymer) has yield: 50 g, softening point: 180° C., number-average molecular weight (Mn): 1350, and weight-average molecular weight (Mw): 3900. The physical characteristics of the resins A-2a to R-2a are shown in Table 8.

TABLE 8

|  | Monomer(VIII)/ {Monomer(VIII) + Monomer(IX)} (unit: mass %) | Monomer(IX)/ {Monomer(VIII) + Monomer(IX)} (unit: mass %) | Type of Monomer(VIII) | Type of Monomer(IX) | Softening point (° C.) | Mn | Mw |
|---|---|---|---|---|---|---|---|
| Aromatic oil | — | — | — | — | — | — | 300 |
| Resin A-2a | 100 |  | α-methylstyrene |  | 100 | 990 | 1960 |
| Resin B-2a |  | 100 |  | 4,α-dimethylstyrene | 140 | 640 | 1600 |
| Resin C-2a | 60 | 40 | α-methylstyrene | 4,α-dimethylstyrene | 152 | 1200 | 3200 |
| Resin D-2a | 60 | 40 | α-methylstyrene | 4,α-dimethylstyrene | 162 | 1400 | 4100 |
| Resin E-2a | 60 | 40 | α-methylstyrene | 4,α-dimethylstyrene | 181 | 1300 | 5100 |
| Resin F-2a | 60 | 40 | α-methylstyrene | 4,α-dimethylstyrene | 125 | 970 | 1900 |
| Resin G-2a | 70 | 30 | α-methylstyrene | 4,α-dimethylstyrene | 138 | 1100 | 3100 |
| Resin H-2a | 50 | 50 | α-methylstyrene | 4,α-dimethylstyrene | 165 | 1070 | 3000 |
| Resin I-2a | 30 | 70 | α-methylstyrene | 4,α-dimethylstyrene | 184 | 1400 | 4200 |
| Resin J-2a | 10 | 90 | α-methylstyrene | 4,α-dimethylstyrene | 148 | 1150 | 3100 |
| Resin K-2a | 90 | 10 | α-methylstyrene | 4,α-dimethylstyrene | 138 | 1100 | 3000 |
| Resin L-2a | 90 | 10 | α-methylstyrene | 4-tert-butyl-α-methylstyrene | 153 | 1350 | 3900 |
| Resin M-2a | 90 | 10 | α-methylstyrene | 4-tert-butyl-α-methylstyrene | 153 | 1300 | 4900 |
| Resin N-2a | 90 | 10 | α-methylstyrene | 4-tert-butyl-α-methylstyrene | 130 | 870 | 2100 |
| Resin O-2a | 80 | 20 | α-methylstyrene | 4-tert-butyl-α-methylstyrene | 165 | 1350 | 4000 |
| Resin P-2a | 60 | 40 | α-methylstyrene | 4-tert-butyl-α-methylstyrene | 170 | 1300 | 4000 |
| Resin Q-2a | 40 | 60 | α-methylstyrene | 4-tert-butyl-α-methylstyrene | 175 | 1350 | 4100 |
| Resin R-2a | 10 | 90 | α-methylstyrene | 4-tert-butyl-α-methylstyrene | 180 | 1350 | 3900 |

Comparative Examples 2-1 to 2-6 and Examples 2-1 to 2-22

Respective rubber compositions were obtained by blending the aforementioned resins A-2a to R-2a with styrene-butadiene copolymer rubber, carbon black and aromatic oil by using a Banbury mixer, for mixing, according to the blending protocols (unit: parts by mass) shown in Tables 9 to 13 below. Each of the rubber compositions thus obtained was vulcanized at 145° C. for 45 minutes and then subjected to the measurements and evaluations described above. The results are shown in Tables 9 to 13.

TABLE 9

|  | Comp. Example 2-1 | Comp. Example 2-2 | Comp. Example 2-3 | Comp. Example 2-4 |
|---|---|---|---|---|
| Styrene-butadiene copolymer rubber *29 | 100 | 100 | 100 | 100 |
| Carbon black *30 | 65 | 65 | 65 | 65 |
| Aromatic oil | 10 | — | — | — |
| Stearic acid | 2.5 | 2.5 | 2.5 | 2.5 |
| Zinc white | 2.5 | 2.5 | 2.5 | 2.5 |
| Anti-aging agent *31 | 1.5 | 1.5 | 1.5 | 1.5 |
| Vulcanization accelerator A *32 | 1.2 | 1.2 | 1.2 | 1.2 |
| Vulcanization accelerator B *33 | 1.2 | 1.2 | 1.2 | 1.2 |
| Sulfur | 1 | 1 | 1 | 1 |
| Resin A-2a | — | 10 | — | 105 |
| Resin B-2a | — | — | 10 | — |
| Resin C-2a | — | — | — | — |
| Resin D-2a | — | — | — | — |
| Resin E-2a | — | — | — | — |

TABLE 9-continued

|  | Comp. Example 2-1 | Comp. Example 2-2 | Comp. Example 2-3 | Comp. Example 2-4 |
|---|---|---|---|---|
| Resin F-2a | — | — | — | — |
| Resin G-2a | — | — | — | — |
| Resin H-2a | — | — | — | — |
| Resin I-2a | — | — | — | — |
| Resin J-2a | — | — | — | — |
| Resin K-2a | — | — | — | — |
| Resin L-2a | — | — | — | — |
| Resin M-2a | — | — | — | — |
| Resin N-2a | — | — | — | — |
| Resin O-2a | — | — | — | — |
| Resin P-2a | — | — | — | — |
| Resin Q-2a | — | — | — | — |
| Resin R-2a | — | — | — | — |
| <Evaluation> | | | | |
| Dry skid properties | 100 | 104 | 101 | 85 |
| Tire grip properties (grip properties at low temperature) | 5 | 4 | 5 | 2 |
| Tire grip properties (grip properties at low temperature) | 2 | 4 | 3 | 3 |

TABLE 10

|  | Example 2-1 | Example 2-2 | Example 2-3 | Example 2-4 | Example 2-5 | Example 2-6 | Example 2-7 |
|---|---|---|---|---|---|---|---|
| Styrene-butadiene copolymer rubber *29 | 100 | 100 | 100 | 100 | 100 | 100 | 100 |
| Carbon black *30 | 65 | 65 | 65 | 65 | 65 | 65 | 65 |
| Aromatic oil | — | — | — | — | — | — | — |
| Stearic acid | 2.5 | 2.5 | 2.5 | 2.5 | 2.5 | 2.5 | 2.5 |
| Zinc white | 2.5 | 2.5 | 2.5 | 2.5 | 2.5 | 2.5 | 2.5 |
| Anti-aging agent *31 | 1.5 | 1.5 | 1.5 | 1.5 | 1.5 | 1.5 | 1.5 |
| Vulcanization accelerator A *32 | 1.2 | 1.2 | 1.2 | 1.2 | 1.2 | 1.2 | 1.2 |
| Vulcanization accelerator B *33 | 1.2 | 1.2 | 1.2 | 1.2 | 1.2 | 1.2 | 1.2 |
| Sulfur | 1 | 1 | 1 | 1 | 1 | 1 | 1 |
| Resin A-2a | — | — | — | — | — | — | — |
| Resin B-2a | — | — | — | — | — | — | — |
| Resin C-2a | 105 | — | 10 | — | — | — | — |
| Resin D-2a | — | — | — | 10 | — | — | — |
| Resin E-2a | — | — | — | — | 10 | — | — |
| Resin F-2a | — | — | — | — | — | 10 | — |
| Resin G-2a | — | — | — | — | — | — | 10 |
| Resin H-2a | — | — | — | — | — | — | — |
| Resin I-2a | — | — | — | — | — | — | — |
| Resin J-2a | — | — | — | — | — | — | — |
| Resin K-2a | — | — | — | — | — | — | — |
| Resin L-2a | — | 105 | — | — | — | — | — |
| Resin M-2a | — | — | — | — | — | — | — |
| Resin N-2a | — | — | — | — | — | — | — |
| Resin O-2a | — | — | — | — | — | — | — |
| Resin P-2a | — | — | — | — | — | — | — |
| Resin Q-2a | — | — | — | — | — | — | — |
| Resin R-2a | — | — | — | — | — | — | — |
| <Evaluation> | | | | | | | |
| Dry skid properties | 90 | 91 | 104 | 106 | 110 | 102 | 105 |
| Tire grip properties (grip properties at low temperature) | 2 | 2 | 6 | 6 | 6 | 6 | 6 |
| Tire grip properties (grip properties at low temperature) | 2 | 2 | 5 | 6 | 7 | 4 | 5 |

Note:
All of the numerical values in the table are expressed by the unit of parts by mass.

TABLE 11

|  | Example 2-8 | Example 2-9 | Example 2-10 | Example 2-11 | Example 2-12 | Example 2-13 |
|---|---|---|---|---|---|---|
| Styrene-butadiene copolymer rubber *29 | 100 | 100 | 100 | 100 | 100 | 100 |
| Carbon black *30 | 65 | 65 | 65 | 65 | 65 | 65 |
| Aromatic oil | — | — | — | — | — | — |
| Stearic acid | 2.5 | 2.5 | 2.5 | 2.5 | 2 | 2 |
| Zinc white | 2.5 | 2.5 | 2.5 | 2.5 | 2.5 | 2.5 |
| Anti-aging agent *31 | 1.5 | 1.5 | 1.5 | 1.5 | 1.2 | 1.2 |

TABLE 11-continued

|  | Example 2-8 | Example 2-9 | Example 2-10 | Example 2-11 | Example 2-12 | Example 2-13 |
|---|---|---|---|---|---|---|
| Vulcanization accelerator A *32 | 1.2 | 1.2 | 1.2 | 1.2 | 1.2 | 1.2 |
| Vulcanization accelerator B *33 | 1.2 | 1.2 | 1.2 | 1.2 | 1.2 | 1.2 |
| Sulfur | 1 | 1 | 1 | 1 | 1.5 | 1.5 |
| Resin A-2a | — | — | — | — | — | — |
| Resin B-2a | — | — | — | — | — | — |
| Resin C-2a | — | — | — | — | — | — |
| Resin D-2a | — | — | — | — | — | — |
| Resin E-2a | — | — | — | — | — | — |
| Resin F-2a | — | — | — | — | — | — |
| Resin G-2a | — | — | — | — | — | — |
| Resin H-2a | 10 | — | — | — | — | — |
| Resin I-2a | — | 10 | — | — | — | — |
| Resin J-2a | — | — | 10 | — | — | — |
| Resin K-2a | — | — | — | 10 | — | — |
| Resin L-2a | — | — | — | — | 10 | — |
| Resin M-2a | — | — | — | — | — | 10 |
| Resin N-2a | — | — | — | — | — | — |
| Resin O-2a | — | — | — | — | — | — |
| Resin P-2a | — | — | — | — | — | — |
| Resin Q-2a | — | — | — | — | — | — |
| Resin R-2a | — | — | — | — | — | — |
| <Evaluation> | | | | | | |
| Dry skid properties | 104 | 104 | 103 | 104 | 106 | 107 |
| Tire grip properties (grip properties at low temperature) | 6 | 7 | 6 | 4 | 6 | 6 |
| Tire grip properties (grip properties at low temperature) | 5 | 6 | 4 | 6 | 5 | 6 |

Note:
All of the numerical values in the table are expressed by the unit of parts by mass.

TABLE 12

|  | Example 2-14 | Example 2-15 | Example 2-16 | Example 2-17 | Example 2-18 |
|---|---|---|---|---|---|
| Styrene-butadiene copolymer rubber *29 | 100 | 100 | 100 | 100 | 100 |
| Carbon black *30 | 65 | 65 | 65 | 65 | 65 |
| Aromatic oil | — | — | — | — | — |
| Stearic acid | 2 | 2 | 2 | 2 | 2 |
| Zinc white | 2.5 | 2.5 | 2.5 | 2.5 | 2.5 |
| Anti-aging agent *31 | 1.2 | 1.2 | 1.2 | 1.2 | 1.2 |
| Vulcanization accelerator A *32 | 1.2 | 1.2 | 1.2 | 1.2 | 1.2 |
| Vulcanization accelerator B *33 | 1.2 | 1.2 | 1.2 | 1.2 | 1.2 |
| Sulfur | 1.5 | 1.5 | 1.5 | 1.5 | 1.5 |
| Resin A-2a | — | — | — | — | — |
| Resin B-2a | — | — | — | — | — |
| Resin C-2a | — | — | — | — | — |
| Resin D-2a | — | — | — | — | — |
| Resin E-2a | — | — | — | — | — |
| Resin F-2a | — | — | — | — | — |
| Resin G-2a | — | — | — | — | — |
| Resin H-2a | — | — | — | — | — |
| Resin I-2a | — | — | — | — | — |
| Resin J-2a | — | — | — | — | — |
| Resin K-2a | — | — | — | — | — |
| Resin L-2a | — | — | — | — | — |
| Resin M-2a | — | — | — | — | — |
| Resin N-2a | 10 | — | — | — | — |
| Resin O-2a | — | 10 | — | — | — |
| Resin P-2a | — | — | 10 | — | — |
| Resin Q-2a | — | — | — | 10 | — |
| Resin R-2a | — | — | — | — | 10 |
| <Evaluation> | | | | | |
| Dry skid properties | 103 | 104 | 102 | 102 | 101 |
| Tire grip properties (grip properties at low temperature) | 6 | 6 | 7 | 7 | 6 |
| Tire grip properties (grip properties at low temperature) | 4 | 6 | 6 | 5 | 4 |

Note:
All of the numerical values in the table are expressed by the unit of parts by mass.

TABLE 13

|  | Comp. Example 2-5 | Comp. Example 2-6 | Example 2-19 | Example 2-20 | Example 2-21 | Example 2-22 |
|---|---|---|---|---|---|---|
| Styrene-butadiene copolymer rubber *29 | 100 | 100 | 100 | 100 | 100 | 100 |
| Carbon black *30 | 65 | 65 | 65 | 65 | 65 | 65 |
| Aromatic oil | — | — | — | — | — | — |
| Stearic acid | 2.5 | 2.5 | 2.5 | 2.5 | 2.5 | 2.5 |
| Zinc white | 2.5 | 2.5 | 2.5 | 2.5 | 2.5 | 2.5 |

TABLE 13-continued

|  | Comp. Example 2-5 | Comp. Example 2-6 | Example 2-19 | Example 2-20 | Example 2-21 | Example 2-22 |
|---|---|---|---|---|---|---|
| Anti-aging agent *31 | 1.5 | 1.5 | 1.5 | 1.5 | 1.5 | 1.5 |
| Vulcanization accelerator A *32 | 1.2 | 1.2 | 1.2 | 1.2 | 1.2 | 1.2 |
| Vulcanization accelerator B *33 | 1.2 | 1.2 | 1.2 | 1.2 | 1.2 | 1.2 |
| Sulfur | 1 | 1 | 1 | 1 | 1 | 1 |
| Resin A-2a | 60 | 30 | — | — | — | — |
| Resin B-2a | — | — | — | — | — | — |
| Resin C-2a | — | — | 60 | — | 30 | — |
| Resin D-2a | — | — | — | — | — | — |
| Resin E-2a | — | — | — | — | — | — |
| Resin F-2a | — | — | — | — | — | — |
| Resin G-2a | — | — | — | — | — | — |
| Resin H-2a | — | — | — | — | — | — |
| Resin I-2a | — | — | — | — | — | — |
| Resin J-2a | — | — | — | — | — | — |
| Resin K-2a | — | — | — | — | — | — |
| Resin L-2a | — | — | — | 60 | — | 30 |
| Resin M-2a | — | — | — | — | — | — |
| Resin N-2a | — | — | — | — | — | — |
| Resin O-2a | — | — | — | — | — | — |
| Resin P-2a | — | — | — | — | — | — |
| Resin Q-2a | — | — | — | — | — | — |
| Resin R-2a | — | — | — | — | — | — |
| <Evaluation> | | | | | | |
| Dry skid properties | 97 | 98 | 107 | 107 | 105 | 106 |
| Tire grip properties (grip properties at low temperature) | 3 | 4 | 4 | 5 | 4 | 6 |
| Tire grip properties (grip properties at low temperature) | 4 | 4 | 7 | 7 | 6 | 6 |

Note:
All of the numerical values in the table are expressed by the unit of parts by mass.
*29: "1500", manufactured by JSR Corporation
*30: SAF ($N_2SA$ or nitrogen absorption specific surface area: 150 $m^2/g$)
*31: N-1,3-dimethyl-butyl-N'-phenyl-p-phenylenediamine
*32: N-tert-butyl-2-benzothiazyl-sulfenamide
*33: Tetrakis(2-ethylhexyl) thiuram disulfide From Tables 9 to 13, it is understood that the rubber compositions of Examples, containing the monomer (VIII) and the monomer (IX), are excellent in both grip properties at a relatively low temperature and grip properties at a relatively high temperature, as compared with the rubber composition of Comp. Example 2-1 not containing these monomers (VIII, IX) at all or the rubber compositions of Comp. Examples 2-2 to 2-6 each using the monomer (VIII) or the monomer (IX) solely not in combination of the two.

Further, it is understood that grip properties at a relatively high temperature tends to deteriorate in Example 2-6 and Examples 2-14 where the Mw of each of the resins is less than 3,000, as compared with other Examples.

Yet further, it is understood that, when a resin obtained by copolymerizing the monomer (VIII) as a monomer in which $X^2$ of formula (VIII) is a hydrogen atom and the monomer (IX) as a monomer in which Y of formula (IX) is $CH_3$ is used, Examples 2-10 and 2-11 each having a proportion of the monomer (IX) (in the total 100 mass % of the monomer (VIII) and the monomer (IX)) beyond the specified range of 20 to 70 mass % exhibit tendency of less satisfactorily maintaining good balance between the low temperature grip properties and the high temperature grip properties than Examples 2-3 to 2-9. Accordingly, it is understood that the proportion of the monomer (IX) is preferably in the range of 20 to 70 mass % in the case of the aforementioned resin.

Yet further, it is understood that, when a resin obtained by copolymerizing the monomer (VIII) as a monomer in which $X^2$ of formula (VIII) is a hydrogen atom and the monomer (IX) as a monomer in which Y of formula (IX) is $C_4H_9$ is used, Examples 2-12 and 2-15 each having a proportion of the monomer (IX) (in the total 100 mass % of the monomer (VIII) and the monomer (IX)) beyond the specified range of 40 to 95 mass % exhibit tendency of less satisfactorily maintaining good balance between the low temperature grip properties and the high temperature grip properties than Examples 2-16 to 2-18. Accordingly, it is understood that the proportion of the monomer (IX) is preferably in the range of 40 to 95 mass % in the case of the aforementioned resin.

Yet further, it is understood that the rubber compositions of Examples 2-3 to 2-22, each containing a resin composed of the aforementioned monomers by a content of 1 to 100 parts by mass with respect to 100 parts by mass of the rubber component, exhibit better dry skid properties, as well as better grip properties, than Examples 2-1 and 2-2. Further, with reference to Examples 2-3, 2-19 and 2-21 or Examples 2-12, 2-20 and 2-22, it is understood that the content of the aforementioned resin is preferably in the range of 2 to 40 parts by mass and more preferably in the range of 2 to 20 parts by mass in terms of satisfactorily achieving all of the relevant properties with good balance therebetween.

[Resin B-2b]

A commercial product ("FTR0140" having softening point: 140° C., number-average molecular weight (Mn): 1510 and weight-average molecular weight (Mw): 2760, manufactured by Mitsui Chemicals, Inc.) is used as resin B-2b (α-dimethylstyrene homopolymer).

[Resin C-2b]

A stirring device, a thermometer and a reflux condenser are mounted to a 500 ml four-neck flask. To the four-neck flask, 108.0 g of α-methylstyrene, 12.0 g of 4-tert-butyl-α-methylstyrene and 300 ml of toluene are charged as a reaction mixed solution and the solution is stirred thoroughly. Thereafter, the reaction mixed solution, which has been uniformly dispersed, is cooled to the temperature range of −3 to −1° C. by using an ethanol bath cooled by dry ice. 1.2 g of tin (IV) chloride (manufactured by Kanto Chemical Co., Inc.) and 2.4 g of toluene as catalyst are charged in a dropping funnel and the dropping funnel is mounted to the four-neck flask.

Next, the catalyst is added dropwise to the reaction mixed solution during a period of 15 minutes in a state where the temperature of the reaction mixed solution is maintained in the range of −3 to −1° C. by using the ethanol bath, so that a polymerization reaction is started. After dropwise addition of the catalyst is completed, the solution is stirred for further 30 minutes in the state where the temperature of the solution is kept in the range of −3 to −1° C. After the polymerization reaction is completed, the reaction mixed solution is washed with 0.5N aqueous sodium hydroxide and then water and then dried by using anhydrous sodium sulfate. The resulting reaction mixed solution is added dropwise to 960 g of ethnol prepared in advance during a period of 30 minutes, whereby powdery precipitates are obtained. The powder is filtered, washed with 200 g of ethanol and dried under a reduced pressure, to obtain resin C-2b (an α-methylstyrene/4-tert-butyl-α-methylstyrene homopolymer) with yield of 72 g. The resin thus obtained has softening point: 171° C., number-average molecular weight (Mn): 2900, and weight-average molecular weight (Mw): 11020.

[Preparation of Resin D-2b]

A resin D-2b is prepared in a manner similar to that of preparing the resin C-2b, except that the polymerization reaction is allowed to proceed in a state where the temperature of the reaction mixed solution is maintained in the range of −12 to −10° C. in the former.

The resin D-2b thus obtained (an α-methylstyrene/4-tert-butyl-α-methylstyrene homopolymer) has yield: 96 g, softening point: 175° C., number-average molecular weight (Mn): 3882, and weight-average molecular weight (Mw): 24068.

[Preparation of Resin E-2b]

A resin E-2b is prepared in a manner similar to that of preparing the resin C-2b, except that 60 g of α-methylstyrene and 60 g of 4-tert-butyl-α-methylstyrene are used and that the polymerization reaction is allowed to proceed in a state where the temperature of the reaction mixed solution is maintained in the range of −6 to −5° C. in the former. The resin E-2b thus obtained (an α-methylstyrene/4-tert-butyl-α-methylstyrene homopolymer) has yield: 78 g, softening point: 204° C., number-average molecular weight (Mn): 2516, and weight-average molecular weight (Mw): 10066.

[Preparation of Resin F-2b]

A resin F-2b is prepared in a manner similar to that of preparing the resin E-2b, except that the polymerization reaction is allowed to proceed in a state where the temperature of the reaction mixed solution is maintained in the range of −16 to −15° C. in the former. The resin F-2b thus obtained (an α-methylstyrene/4-tert-butyl-α-methylstyrene homopolymer) has yield: 101 g, softening point: 235° C., number-average molecular weight (Mn): 3968, and weight-average molecular weight (Mw): 23807.

[Preparation of Resin G-2b]

A resin G-2b is prepared in a manner similar to that of preparing the resin C-2b, except that 36.0 g of α-methylstyrene and 84.0 g of 4-tert-butyl-α-methylstyrene are used and that the polymerization reaction is allowed to proceed in a state where the temperature of the reaction mixed solution is maintained in the range of −8 to −7° C. in the former. The resin G-2b thus obtained (an α-methylstyrene/4-tert-butyl-α-methylstyrene homopolymer) has yield: 80 g, softening point: 212° C., number-average molecular weight (Mn): 2784, and weight-average molecular weight (Mw): 10024.

[Preparation of Resin H-2b]

A resin H-2b is prepared in a manner similar to that of preparing the resin G-2b, except that the polymerization reaction is allowed to proceed in a state where the temperature of the reaction mixed solution is maintained in the range of −18 to −17° C. in the former. The resin H-2b thus obtained (an α-methylstyrene/4-tert-butyl-α-methylstyrene homopolymer) has yield: 101 g, softening point: 217° C., number-average molecular weight (Mn): 3846, and weight-average molecular weight (Mw): 24228.

[Preparation of Resin I-2b]

A resin I-2b is prepared in a manner similar to that of preparing the resin C-2b, except that 12.0 g of α-methylstyrene and 108.0 g of 4-tert-butyl-α-methylstyrene are used and that the polymerization reaction is allowed to proceed in a state where the temperature of the reaction mixed solution is maintained in the range of −8 to −6° C. in the former. The resin I-2b thus obtained (an α-methylstyrene/4-tert-butyl-α-methylstyrene homopolymer) has yield: 76 g, softening point: 215° C., number-average molecular weight (Mn): 2674, and weight-average molecular weight (Mw): 10695.

[Preparation of Resin J-2b]

A resin J-2b is prepared in a manner similar to that of preparing the resin I-2b, except that the polymerization reaction is allowed to proceed in a state where the temperature of the reaction mixed solution is maintained in the range of −18 to −16° C. in the former. The resin J-2b thus obtained (an α-methylstyrene/4-tert-butyl-α-methylstyrene homopolymer) has yield: 102 g, softening point: 230° C., number-average molecular weight (Mn): 4080, and weight-average molecular weight (Mw): 25298. The physical properties of the resins B-2b to J-2b are shown in FIG. 14.

TABLE 14

| | Monomer(I)/ {Monomer(I) + Monomer(II)} (unit: mass %) | Monomer(II)/ {Monomer(I) + Monomer(II)} (unit: mass %) | Type of Monomer(I) | Type of Monomer(II) | Softening point (° C.) | Mn | Mw |
| --- | --- | --- | --- | --- | --- | --- | --- |
| Resin B-2b | 100 | | | 4,α-dimethylstyrene | 140 | 1510 | 2760 |
| Resin C-2b | 90 | 10 | α-methylstyrene | 4-tert-butyl-α-methylstyrene | 171 | 2900 | 11020 |
| Resin D-2b | 90 | 10 | α-methylstyrene | 4-tert-butyl-α-methylstyrene | 175 | 3882 | 24068 |
| Resin E-2a | 50 | 50 | α-methylstyrene | 4-tert-butyl-α-methylstyrene | 204 | 2516 | 10066 |
| Resin F-2a | 50 | 50 | α-methylstyrene | 4-tert-butyl-α-methylstyrene | 235 | 3968 | 23807 |
| Resin G-2a | 30 | 70 | α-methylstyrene | 4-tert-butyl-α-methylstyrene | 212 | 2784 | 10024 |
| Resin H-2a | 30 | 70 | α-methylstyrene | 4-tert-butyl-α-methylstyrene | 217 | 3846 | 24228 |

TABLE 14-continued

|  | Monomer(I)/ {Monomer(I) + Monomer(II)} (unit: mass %) | Monomer(II)/ {Monomer(I) + Monomer(II)} (unit: mass %) | Type of Monomer(I) | Type of Monomer(II) | Softening point (° C.) | Mn | Mw |
|---|---|---|---|---|---|---|---|
| Resin I-2a | 10 | 90 | α-methylstyrene | 4-tert-butyl-α-methylstyrene | 215 | 2674 | 10695 |
| Resin J-2b | 10 | 90 | α-methylstyrene | 4-tert-butyl-α-methylstyrene | 230 | 4080 | 25298 |

Comparative Examples 2-7 to 2-8 and Examples 2-23 to 2-34

Respective rubber compositions were obtained by blending the aforementioned resins B-2b to J-2b with styrene-butadiene copolymer rubber and carbon black by using a Banbury mixer, for mixing, according to the blending protocols (unit: parts by mass) shown in Tables 15 and 16 below. Each of the rubber compositions thus obtained was vulcanized at 145° C. for 45 minutes and then subjected to the measurements and evaluations described above. The results are shown in Tables 15 and 16.

TABLE 15

|  | Comp. Example 2-7 | Comp. Example 2-8 | Example 2-23 | Example 2-24 | Example 2-25 | Example 2-26 | Example 2-27 |
|---|---|---|---|---|---|---|---|
| Styrene-butadiene copolymer *29 | 100 | 100 | 100 | 100 | 100 | 100 | 100 |
| Carbon black *30 | 65 | 65 | 65 | 65 | 65 | 65 | 65 |
| Stearic acid | 2.5 | 2.5 | 2.5 | 2.5 | 2.5 | 2.5 | 2.5 |
| Zinc white | 2.5 | 2.5 | 2.5 | 2.5 | 2.5 | 2.5 | 2.5 |
| Anti-aging agent *31 | 1.5 | 1.5 | 1.5 | 1.5 | 1.5 | 1.5 | 1.5 |
| Vulcanization accelerator A *32 | 1.2 | 1.2 | 1.2 | 1.2 | 1.2 | 1.2 | 1.2 |
| Vulcanization accelerator B *33 | 1.2 | 1.2 | 1.2 | 1.2 | 1.2 | 1.2 | 1.2 |
| Sulfur | 1 | 1 | 1 | 1 | 1 | 1 | 1 |
| Resin B-2b | 10 | 105 | — | — | — | — | — |
| Resin C-2b | — | — | 10 | 30 | 60 | 100 | 105 |
| Resin D-2b | — | — | — | — | — | — | — |
| Resin E-2b | — | — | — | — | — | — | — |
| Resin F-2b | — | — | — | — | — | — | — |
| Resin G-2b | — | — | — | — | — | — | — |
| Resin H-2b | — | — | — | — | — | — | — |
| Resin I-2b | — | — | — | — | — | — | — |
| Resin J-2b | — | — | — | — | — | — | — |
| <Evaluation> |  |  |  |  |  |  |  |
| Dry skid properties | 101 | 90 | 103 | 104 | 107 | 108 | 101 |
| Tire grip properties (grip properties at low temperature) | 5 | 2 | 6 | 6 | 6 | 6 | 4 |
| Tire grip properties (grip properties at low temperature) | 3 | 2 | 4 | 5 | 6 | 5 | 4 |

Note:
All of the numerical values in the table are expressed by the unit of parts by mass.

TABLE 16

|  | Example 2-28 | Example 2-29 | Example 2-30 | Example 2-31 | Example 2-32 | Example 2-33 | Example 2-34 |
|---|---|---|---|---|---|---|---|
| Styrene-butadiene copolymer rubber *29 | 100 | 100 | 100 | 100 | 100 | 100 | 100 |
| Carbon black *30 | 65 | 65 | 65 | 65 | 65 | 65 | 65 |
| Stearic acid | 2.5 | 2.5 | 2.5 | 2.5 | 2.5 | 2.5 | 2.5 |
| Zinc white | 2.5 | 2.5 | 2.5 | 2.5 | 2.5 | 2.5 | 2.5 |
| Anti-aging agent *31 | 1.5 | 1.5 | 1.5 | 1.5 | 1.5 | 1.5 | 1.5 |
| Vulcanization accelerator A *32 | 1.2 | 1.2 | 1.2 | 1.2 | 1.2 | 1.2 | 1.2 |
| Vulcanization accelerator B *33 | 1.2 | 1.2 | 1.2 | 1.2 | 1.2 | 1.2 | 1.2 |
| Sulfur | 1 | 1 | 1 | 1 | 1 | 1 | 1 |
| Resin B-2b | — | — | — | — | — | — | — |
| Resin C-2b | — | — | — | — | — | — | — |
| Resin D-2b | 10 | — | — | — | — | — | — |
| Resin E-2b | — | 10 | — | — | — | — | — |
| Resin F-2b | — | — | 10 | — | — | — | — |

TABLE 16-continued

| | Example 2-28 | Example 2-29 | Example 2-30 | Example 2-31 | Example 2-32 | Example 2-33 | Example 2-34 |
|---|---|---|---|---|---|---|---|
| Resin G-2b | — | — | — | 10 | — | — | — |
| Resin H-2b | — | — | — | — | 10 | — | — |
| Resin I-2b | — | — | — | — | — | 10 | — |
| Resin J-2b | — | — | — | — | — | — | 10 |
| <Evaluation> | | | | | | | |
| Dry skid properties | 104 | 106 | 110 | 105 | 107 | 105 | 108 |
| Tire grip properties (grip properties at low temperature) | 7 | 6 | 6 | 6 | 6 | 4 | 4 |
| Tire grip properties (grip properties at low temperature) | 6 | 6 | 7 | 5 | 6 | 6 | 7 |

Note:
All of the numerical values in the table are expressed by the unit of parts by mass.
*29 to *33 are synonymous with those of Tables 9 to 13.

From Tables 15 and 16, it is understood that the rubber compositions of Examples 2-23 to 2-34, containing the monomer (I) and the monomer (II), are excellent in both grip properties at a relatively low temperature and grip properties at a relatively high temperature, as compared with the rubber composition of Comp. Example 2-1 not containing these monomers (I, II) at all shown in Table 9 or the rubber compositions of Comp. Examples 2-2 to 2-4 in Table 9, Comp. Examples 2-5 and 2-6 in Table 13 and Comp. Examples 2-7 to 2-8 in Table 15 each using each of these monomers solely not in combination of the two.

Further, it is understood that, when a resin obtained by copolymerizing the monomer (I) as a monomer in which X of formula (I) is a hydrogen atom and the monomer (II) as a monomer in which Y of formula (II) is $C_4H_9$ is used, the rubber compositions of Examples 2-23 and 2-28 each having a proportion of the monomer (II) (in the total 100 mass % of the monomer (I) and the monomer (II)) beyond the specified range of 40 to 95 mass % exhibit tendency of less satisfactorily maintaining good balance between the low temperature grip properties and the high temperature grip properties than Examples 2-29 to 2-34. Accordingly, it is understood that the proportion of the monomer (II) is preferably in the range of 40 to 95 mass % in the case of the aforementioned resin.

What is claimed is:

1. A rubber composition, comprising:
a rubber component made of at least one of diene-based polymer; and
a copolymer resin obtained by copolymerizing a monomer (I) represented by formula (I) below and an indene,
wherein the rubber composition contains, with respect to 100 parts by mass of the rubber component, 1 to 100 parts by mass of a copolymer resin obtained by copolymerizing "a" mass % of the monomer (I) and "b" mass % of said indene such that a and b satisfy formulae (II) to (IV) below:

$$5 \leq a < 95 \quad (II)$$

$$1 < b \leq 95 \quad (III)$$

$$90 < a+b \leq 100 \quad (IV)$$

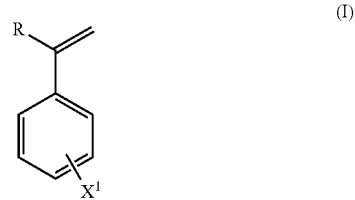

wherein R represents a $C_1$-$C_8$ normal or branched alkyl group, $X^1$ represents a hydrogen atom or a $C_1$-$C_8$ normal or branched alkyl group, an aryl group having a substitution group, or a halogen group, and R and $X^1$ may be either the same or different.

2. The rubber composition of claim 1, wherein the monomer (I) represented by the formula (I) is α-methylstyrene,
the copolymer resin is an α-methylstyrene/indene copolymer resin, and
the proportion of said α-methylstyrene (a mass %) satisfies formula (V) below:

$$60 \leq a < 95 \quad (V).$$

3. The rubber composition of claim 2, wherein the softening point of the α-methylstyrene/indene copolymer resin is in the range of 100 to 170° C.

4. The rubber composition of claim 1, wherein $X^1$ in formula (I) is a $C_1$-$C_8$ normal or branched alkyl group, an aryl group having a substitution group, or a halogen group, and the softening point of the copolymer resin is in the range of 160 to 250° C.

5. The rubber composition of claim 1, wherein the weight-average molecular weight (Mw) of the copolymer resin is in the range of 1,000 to 10,000.

6. The rubber composition of claim 1, wherein the monomer (I) represented by the formula (I) is 4-tert-butyl-α-methylstyrene.

7. A rubber composition, comprising:
a rubber component made of at least one of diene-based polymer;
and
a copolymer resin obtained by copolymerizing a monomer (VIII) represented by formula (VIII) below and an aromatic vinyl monomer as monomer (IX) represented by formula (IX) below:

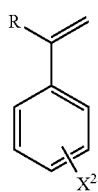

(VIII)

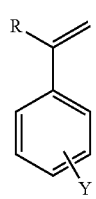

(IX)

wherein R represents a $C_1$-$C_8$ normal or branched alkyl group; in the formula (VIII), $X^2$ represents a hydrogen atom, a $C_1$-$C_8$ alkyl group, a $C_1$-$C_8$ aryl group, a $C_1$-$C_8$ alkenyl group, or a halogen group; in formula (IX), Y represents a $C_1$-$C_8$ alkyl group, a $C_1$-$C_8$ aryl group, a $C_1$-$C_8$ alkenyl group, or a halogen group; $X^2$ and Y are different from each other.

8. The rubber composition of claim 7, wherein the weight-average molecular weight (Mw) of the copolymer resin is in the range of 3,000 to 30,000.

9. The rubber composition of claim 7, wherein $X^2$ in the formula (VIII) is a hydrogen atom, $CH_3$ or $C_3H_7$ in the monomer (VIII).

10. The rubber composition of claim 7, wherein Y in the formula (IX) is $CH_3$, $C_3H_7$ or $C_4H_9$ in the monomer (IX).

11. The rubber composition of claim 7, wherein the copolymer resin is obtained by copolymerizing the monomer (VIII) as a monomer in which $X^2$ in the formula (VIII) is a hydrogen and the monomer (IX) as a monomer in which Y in the formula (IX) is $CH_3$, and
a proportion of the monomer (IX) is in the range of 20 to 70 mass % with respect to the total 100 mass % of the monomer (VIII) and the monomer (IX).

12. The rubber composition of claim 7, wherein the copolymer resin is obtained by copolymerizing the monomer (VIII) as a monomer in which $X^2$ in the formula (VIII) is a hydrogen and the monomer (IX) as a monomer in which Y in the formula (IX) is $C_4H_9$, and
a proportion of the monomer (IX) is in the range of 40 to 95 mass % with respect to the total 100 mass % of the monomer (VIII) and the monomer (IX).

13. The rubber composition of claim 7, wherein the copolymer resin is obtained by copolymerizing the monomer (VIII) as a monomer in which $X^2$ in the formula (VIII) is a hydrogen and the monomer (IX) as a monomer in which Y in the formula (IX) is $C_3H_7$, and
a proportion of the monomer (IX) is in the range of 30 to 90 mass % with respect to the total 100 mass % of the monomer (VIII) and the monomer (IX).

14. The rubber composition of claim 7, wherein the copolymer resin is obtained by copolymerizing the monomer (VIII) as a monomer in which $X^2$ in the formula (VIII) is $CH_3$ and the monomer (IX) as a monomer in which Y in the formula (IX) is $C_4H_9$, and
a proportion of the monomer (IX) is in the range of 20 to 95 mass % with respect to the total 100 mass % of the monomer (VIII) and the monomer (IX).

15. The rubber composition of claim 7, wherein the copolymer resin is obtained by copolymerizing the monomer (VIII) as a monomer in which $X^2$ in the formula (VIII) is $C_3H_7$ and the monomer (IX) as a monomer in which Y in the formula (IX) is $C_4H_9$, and
a proportion of the monomer (IX) is in the range of 10 to 80 mass % with respect to the total 100 mass % of the monomer (VIII) and the monomer (IX).

16. The rubber composition of claim 7, wherein 1 to 100 parts by mass of the copolymer resin is blended with 100 parts by mass of the rubber component.

17. A tire, obtained by using a rubber composition, comprising:
a rubber component made of at least one of diene-based polymer; and
a copolymer resin obtained by copolymerizing a monomer (I) represented by formula (I) below and an indene,
wherein the rubber composition contains, with respect to 100 parts by mass of the rubber component, 1 to 100 parts by mass of a copolymer resin obtained by copolymerizing "a" mass % of the monomer (I) and "b" mass % of said indene such that a and b satisfy formulae (II) to (IV) below:

$$5 \leq a < 95 \tag{II}$$

$$1 < b \leq 95 \tag{III}$$

$$90 < a+b \leq 100 \tag{IV}$$

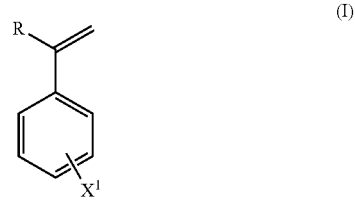

(I)

wherein R represents a $C_1$-$C_8$ normal or branched alkyl group, $X^1$ represents a hydrogen atom or a $C_1$-$C_8$ normal or branched alkyl group, an aryl group having a substitution group, or a halogen group, and R and $X^1$ may be either the same or different.

* * * * *